(12) United States Patent
Perlmutter et al.

(10) Patent No.: US 8,230,300 B2
(45) Date of Patent: Jul. 24, 2012

(54) EFFICIENT READOUT FROM ANALOG MEMORY CELLS USING DATA COMPRESSION

(75) Inventors: Uri Perlmutter, Holon (IL); Dotan Sokolov, Ra'Anana (IL); Ofir Shalvi, Ra'Anana (IL); Oren Golov, Hod-Hasharon (IL)

(73) Assignee: Apple Inc., Cupertino, CA (US)

( * ) Notice: Subject to any disclaimer, the term of this patent is extended or adjusted under 35 U.S.C. 154(b) by 720 days.

(21) Appl. No.: 12/397,368

(22) Filed: Mar. 4, 2009

(65) Prior Publication Data

US 2009/0228761 A1 Sep. 10, 2009

Related U.S. Application Data

(60) Provisional application No. 61/034,511, filed on Mar. 7, 2008, provisional application No. 61/052,276, filed on May 12, 2008, provisional application No. 61/053,031, filed on May 14, 2008.

(51) Int. Cl.
*G11C 27/00* (2006.01)
(52) U.S. Cl. ...................................... 714/763
(58) Field of Classification Search .................. 714/763
See application file for complete search history.

(56) References Cited

U.S. PATENT DOCUMENTS

| 3,668,631 | A | 6/1972 | Griffith et al. |
|---|---|---|---|
| 3,668,632 | A | 6/1972 | Oldham |
| 4,058,851 | A | 11/1977 | Scheuneman |
| 4,112,502 | A | 9/1978 | Scheuneman |
| 4,394,763 | A | 7/1983 | Nagano et al. |
| 4,413,339 | A | 11/1983 | Riggle et al. |
| 4,556,961 | A | 12/1985 | Iwahashi et al. |
| 4,558,431 | A | 12/1985 | Satoh |
| 4,608,687 | A | 8/1986 | Dutton |
| 4,654,847 | A | 3/1987 | Dutton |
| 4,661,929 | A | 4/1987 | Aoki et al. |
| 4,768,171 | A | 8/1988 | Tada |
| 4,811,285 | A | 3/1989 | Walker et al. |
| 4,899,342 | A | 2/1990 | Potter et al. |
| 4,910,706 | A | 3/1990 | Hyatt |
| 4,993,029 | A | 2/1991 | Galbraith et al. |
| 5,056,089 | A | 10/1991 | Furuta et al. |
| 5,077,722 | A | 12/1991 | Geist et al. |
| 5,126,808 | A | 6/1992 | Montalvo et al. |

(Continued)

FOREIGN PATENT DOCUMENTS

EP 0783754 B1 7/1997

(Continued)

OTHER PUBLICATIONS

U.S. Appl. No. 12/323,544 Office Action dated Dec. 13, 2011.

(Continued)

*Primary Examiner* — Bryce Bonzo
(74) *Attorney, Agent, or Firm* — Meyertons, Hood, Kivlin, Kowert & Goetzel, P.C.

(57) ABSTRACT

A method for data storage includes storing data in a group of analog memory cells by writing respective input storage values to the memory cells in the group. After storing the data, respective output storage values are read from the analog memory cells in the group. Respective confidence levels of the output storage values are estimated, and the confidence levels are compressed. The output storage values and the compressed confidence levels are transferred from the memory cells over an interface to a memory controller.

34 Claims, 3 Drawing Sheets

U.S. PATENT DOCUMENTS

| | | |
|---|---|---|
| 5,163,021 A | 11/1992 | Mehrotra et al. |
| 5,172,338 A | 12/1992 | Mehrotta et al. |
| 5,182,558 A | 1/1993 | Mayo |
| 5,182,752 A | 1/1993 | DeRoo et al. |
| 5,191,584 A | 3/1993 | Anderson |
| 5,200,959 A | 4/1993 | Gross et al. |
| 5,237,535 A | 8/1993 | Mielke et al. |
| 5,272,669 A | 12/1993 | Samachisa et al. |
| 5,276,649 A | 1/1994 | Hoshita et al. |
| 5,287,469 A | 2/1994 | Tsuboi |
| 5,365,484 A | 11/1994 | Cleveland et al. |
| 5,388,064 A | 2/1995 | Khan |
| 5,416,646 A | 5/1995 | Shirai |
| 5,416,782 A | 5/1995 | Wells et al. |
| 5,446,854 A | 8/1995 | Khalidi et al. |
| 5,450,424 A | 9/1995 | Okugaki et al. |
| 5,469,444 A | 11/1995 | Endoh et al. |
| 5,473,753 A | 12/1995 | Wells et al. |
| 5,479,170 A | 12/1995 | Cauwenberghs et al. |
| 5,508,958 A | 4/1996 | Fazio et al. |
| 5,519,831 A | 5/1996 | Holzhammer |
| 5,532,962 A | 7/1996 | Auclair et al. |
| 5,533,190 A | 7/1996 | Binford et al. |
| 5,541,886 A | 7/1996 | Hasbun |
| 5,600,677 A | 2/1997 | Citta et al. |
| 5,638,320 A | 6/1997 | Wong et al. |
| 5,657,332 A | 8/1997 | Auclair et al. |
| 5,675,540 A | 10/1997 | Roohparvar |
| 5,682,352 A | 10/1997 | Wong et al. |
| 5,687,114 A | 11/1997 | Khan |
| 5,696,717 A | 12/1997 | Koh |
| 5,726,649 A | 3/1998 | Tamaru et al. |
| 5,726,934 A | 3/1998 | Tran et al. |
| 5,742,752 A | 4/1998 | De Koning |
| 5,748,533 A | 5/1998 | Dunlap et al. |
| 5,748,534 A | 5/1998 | Dunlap et al. |
| 5,751,637 A | 5/1998 | Chen et al. |
| 5,761,402 A | 6/1998 | Kaneda et al. |
| 5,798,966 A | 8/1998 | Keeney |
| 5,799,200 A | 8/1998 | Brant et al. |
| 5,801,985 A | 9/1998 | Roohparvar et al. |
| 5,838,832 A | 11/1998 | Barnsley |
| 5,860,106 A | 1/1999 | Domen et al. |
| 5,867,114 A | 2/1999 | Barbir |
| 5,867,428 A | 2/1999 | Ishii et al. |
| 5,867,429 A | 2/1999 | Chen et al. |
| 5,877,986 A | 3/1999 | Harari et al. |
| 5,889,937 A | 3/1999 | Tamagawa |
| 5,901,089 A | 5/1999 | Korsh et al. |
| 5,909,449 A | 6/1999 | So et al. |
| 5,912,906 A | 6/1999 | Wu et al. |
| 5,930,167 A | 7/1999 | Lee et al. |
| 5,937,424 A | 8/1999 | Leak et al. |
| 5,942,004 A | 8/1999 | Cappelletti |
| 5,946,716 A | 8/1999 | Karp et al. |
| 5,969,986 A | 10/1999 | Wong et al. |
| 5,982,668 A | 11/1999 | Ishii et al. |
| 5,991,517 A | 11/1999 | Harari et al. |
| 5,995,417 A | 11/1999 | Chen et al. |
| 6,009,014 A | 12/1999 | Hollmer et al. |
| 6,009,016 A | 12/1999 | Ishii et al. |
| 6,023,425 A | 2/2000 | Ishii et al. |
| 6,034,891 A | 3/2000 | Norman |
| 6,040,993 A | 3/2000 | Chen et al. |
| 6,041,430 A | 3/2000 | Yamauchi |
| 6,073,204 A | 6/2000 | Lakhani et al. |
| 6,101,614 A | 8/2000 | Gonzales et al. |
| 6,128,237 A | 10/2000 | Shirley et al. |
| 6,134,140 A | 10/2000 | Tanaka et al. |
| 6,134,143 A | 10/2000 | Norman |
| 6,134,631 A | 10/2000 | Jennings |
| 6,141,261 A | 10/2000 | Patti |
| 6,151,246 A | 11/2000 | So et al. |
| 6,157,573 A | 12/2000 | Ishii et al. |
| 6,166,962 A | 12/2000 | Chen et al. |
| 6,169,691 B1 | 1/2001 | Pasotti et al. |
| 6,178,466 B1 | 1/2001 | Gilbertson et al. |
| 6,185,134 B1 | 2/2001 | Tanaka et al. |
| 6,209,113 B1 | 3/2001 | Roohparvar |
| 6,212,654 B1 | 4/2001 | Lou et al. |
| 6,219,276 B1 | 4/2001 | Parker |
| 6,219,447 B1 | 4/2001 | Lee et al. |
| 6,222,762 B1 | 4/2001 | Guterman et al. |
| 6,230,233 B1 | 5/2001 | Lofgren et al. |
| 6,240,458 B1 | 5/2001 | Gilbertson |
| 6,259,627 B1 | 7/2001 | Wong |
| 6,275,419 B1 | 8/2001 | Guterman et al. |
| 6,278,632 B1 | 8/2001 | Chevallier |
| 6,279,069 B1 | 8/2001 | Robinson et al. |
| 6,288,944 B1 | 9/2001 | Kawamura |
| 6,292,394 B1 | 9/2001 | Cohen et al. |
| 6,301,151 B1 | 10/2001 | Engh et al. |
| 6,304,486 B1 | 10/2001 | Yano |
| 6,307,776 B1 | 10/2001 | So et al. |
| 6,314,044 B1 | 11/2001 | Sasaki et al. |
| 6,317,363 B1 | 11/2001 | Guterman et al. |
| 6,317,364 B1 | 11/2001 | Guterman et al. |
| 6,345,004 B1 | 2/2002 | Omura et al. |
| 6,360,346 B1 | 3/2002 | Miyauchi et al. |
| 6,363,008 B1 | 3/2002 | Wong |
| 6,363,454 B1 | 3/2002 | Lakhani et al. |
| 6,366,496 B1 | 4/2002 | Torelli et al. |
| 6,385,092 B1 | 5/2002 | Ishii et al. |
| 6,392,932 B1 | 5/2002 | Ishii et al. |
| 6,396,742 B1 | 5/2002 | Korsh et al. |
| 6,397,364 B1 | 5/2002 | Barkan |
| 6,405,323 B1 | 6/2002 | Lin et al. |
| 6,405,342 B1 | 6/2002 | Lee |
| 6,418,060 B1 | 7/2002 | Yong et al. |
| 6,442,585 B1 | 8/2002 | Dean et al. |
| 6,445,602 B1 | 9/2002 | Kokudo et al. |
| 6,452,838 B1 | 9/2002 | Ishii et al. |
| 6,456,528 B1 | 9/2002 | Chen |
| 6,466,476 B1 | 10/2002 | Wong et al. |
| 6,467,062 B1 | 10/2002 | Barkan |
| 6,469,931 B1 | 10/2002 | Ban et al. |
| 6,480,948 B1 | 11/2002 | Virajpet et al. |
| 6,490,236 B1 | 12/2002 | Fukuda et al. |
| 6,522,580 B2 | 2/2003 | Chen et al. |
| 6,525,952 B2 | 2/2003 | Araki et al. |
| 6,532,556 B1 | 3/2003 | Wong et al. |
| 6,538,922 B1 | 3/2003 | Khalid et al. |
| 6,549,464 B2 | 4/2003 | Tanaka et al. |
| 6,553,510 B1 | 4/2003 | Pekny et al. |
| 6,558,967 B1 | 5/2003 | Wong |
| 6,560,152 B1 | 5/2003 | Cernea |
| 6,567,311 B2 | 5/2003 | Ishii et al. |
| 6,577,539 B2 | 6/2003 | Iwahashi |
| 6,584,012 B2 | 6/2003 | Banks |
| 6,615,307 B1 | 9/2003 | Roohparvar |
| 6,621,739 B2 | 9/2003 | Gonzalez et al. |
| 6,640,326 B1 | 10/2003 | Buckingham et al. |
| 6,643,169 B2 | 11/2003 | Rudelic et al. |
| 6,646,913 B2 | 11/2003 | Micheloni et al. |
| 6,678,192 B2 | 1/2004 | Gongwer et al. |
| 6,683,811 B2 | 1/2004 | Ishii et al. |
| 6,687,155 B2 | 2/2004 | Nagasue |
| 6,707,748 B2 | 3/2004 | Lin et al. |
| 6,708,257 B2 | 3/2004 | Bao |
| 6,714,449 B2 | 3/2004 | Khalid |
| 6,717,847 B2 | 4/2004 | Chen |
| 6,731,557 B2 | 5/2004 | Beretta |
| 6,732,250 B2 | 5/2004 | Durrant |
| 6,738,293 B1 | 5/2004 | Iwahashi |
| 6,751,766 B2 | 6/2004 | Guterman et al. |
| 6,757,193 B2 | 6/2004 | Chen et al. |
| 6,774,808 B1 | 8/2004 | Hibbs et al. |
| 6,781,877 B2 | 8/2004 | Cernea et al. |
| 6,804,805 B2 | 10/2004 | Rub |
| 6,807,095 B2 | 10/2004 | Chen et al. |
| 6,807,101 B2 | 10/2004 | Ooishi et al. |
| 6,809,964 B2 | 10/2004 | Moschopoulos et al. |
| 6,819,592 B2 | 11/2004 | Noguchi et al. |
| 6,829,167 B2 | 12/2004 | Tu et al. |
| 6,845,052 B1 | 1/2005 | Ho et al. |
| 6,851,018 B2 | 2/2005 | Wyatt et al. |
| 6,851,081 B2 | 2/2005 | Yamamoto |

| | | |
|---|---|---|
| 6,856,546 B2 | 2/2005 | Guterman et al. |
| 6,862,218 B2 | 3/2005 | Guterman et al. |
| 6,870,767 B2 | 3/2005 | Rudelic et al. |
| 6,870,773 B2 | 3/2005 | Noguchi et al. |
| 6,873,552 B2 | 3/2005 | Ishii et al. |
| 6,879,520 B2 | 4/2005 | Hosono et al. |
| 6,882,567 B1 | 4/2005 | Wong |
| 6,894,926 B2 | 5/2005 | Guterman et al. |
| 6,907,497 B2 | 6/2005 | Hosono et al. |
| 6,925,009 B2 | 8/2005 | Noguchi et al. |
| 6,930,925 B2 | 8/2005 | Guo et al. |
| 6,934,188 B2 | 8/2005 | Roohparvar |
| 6,937,511 B2 | 8/2005 | Hsu et al. |
| 6,958,938 B2 | 10/2005 | Noguchi et al. |
| 6,963,505 B2 | 11/2005 | Cohen |
| 6,972,993 B2 | 12/2005 | Conley et al. |
| 6,988,175 B2 | 1/2006 | Lasser |
| 6,992,932 B2 | 1/2006 | Cohen |
| 6,999,344 B2 | 2/2006 | Hosono et al. |
| 7,002,843 B2 | 2/2006 | Guterman et al. |
| 7,006,379 B2 | 2/2006 | Noguchi et al. |
| 7,012,835 B2 | 3/2006 | Gonzalez et al. |
| 7,020,017 B2 | 3/2006 | Chen et al. |
| 7,023,735 B2 | 4/2006 | Ban et al. |
| 7,031,210 B2 | 4/2006 | Park et al. |
| 7,031,214 B2 | 4/2006 | Tran |
| 7,031,216 B2 | 4/2006 | You |
| 7,039,846 B2 | 5/2006 | Hewitt et al. |
| 7,042,766 B1 | 5/2006 | Wang et al. |
| 7,054,193 B1 | 5/2006 | Wong |
| 7,054,199 B2 | 5/2006 | Lee et al. |
| 7,057,958 B2 | 6/2006 | So et al. |
| 7,065,147 B2 | 6/2006 | Ophir et al. |
| 7,068,539 B2 | 6/2006 | Guterman et al. |
| 7,071,849 B2 | 7/2006 | Zhang |
| 7,072,222 B2 | 7/2006 | Ishii et al. |
| 7,079,555 B2 | 7/2006 | Baydar et al. |
| 7,088,615 B2 | 8/2006 | Guterman et al. |
| 7,099,194 B2 | 8/2006 | Tu et al. |
| 7,102,924 B2 | 9/2006 | Chen et al. |
| 7,113,432 B2 | 9/2006 | Mokhlesi |
| 7,130,210 B2 | 10/2006 | Bathul et al. |
| 7,139,192 B1 | 11/2006 | Wong |
| 7,139,198 B2 | 11/2006 | Guterman et al. |
| 7,145,805 B2 | 12/2006 | Ishii et al. |
| 7,151,692 B2 | 12/2006 | Wu |
| 7,158,058 B1 | 1/2007 | Yu |
| 7,170,781 B2 | 1/2007 | So et al. |
| 7,170,802 B2 | 1/2007 | Cernea et al. |
| 7,173,859 B2 | 2/2007 | Hemink |
| 7,177,184 B2 | 2/2007 | Chen |
| 7,177,195 B2 | 2/2007 | Gonzalez et al. |
| 7,177,199 B2 | 2/2007 | Chen et al. |
| 7,177,200 B2 | 2/2007 | Ronen et al. |
| 7,184,338 B2 | 2/2007 | Nakagawa et al. |
| 7,187,195 B2 | 3/2007 | Kim |
| 7,187,592 B2 | 3/2007 | Guterman et al. |
| 7,190,614 B2 | 3/2007 | Wu |
| 7,193,898 B2 | 3/2007 | Cernea |
| 7,193,921 B2 | 3/2007 | Choi et al. |
| 7,196,644 B1 | 3/2007 | Anderson et al. |
| 7,196,928 B2 | 3/2007 | Chen |
| 7,196,933 B2 | 3/2007 | Shibata |
| 7,197,594 B2 | 3/2007 | Raz et al. |
| 7,200,062 B2 | 4/2007 | Kinsely et al. |
| 7,210,077 B2 | 4/2007 | Brandenberger et al. |
| 7,221,592 B2 | 5/2007 | Nazarian |
| 7,224,613 B2 | 5/2007 | Chen et al. |
| 7,231,474 B1 | 6/2007 | Helms et al. |
| 7,231,562 B2 | 6/2007 | Ohlhoff et al. |
| 7,243,275 B2 | 7/2007 | Gongwer et al. |
| 7,254,690 B2 | 8/2007 | Rao |
| 7,254,763 B2 | 8/2007 | Aadsen et al. |
| 7,257,027 B2 | 8/2007 | Park |
| 7,259,987 B2 | 8/2007 | Chen et al. |
| 7,266,026 B2 | 9/2007 | Gongwer et al. |
| 7,266,069 B2 | 9/2007 | Chu |
| 7,269,066 B2 | 9/2007 | Nguyen et al. |
| 7,272,757 B2 | 9/2007 | Stocken |
| 7,274,611 B2 | 9/2007 | Roohparvar |
| 7,277,355 B2 | 10/2007 | Tanzawa |
| 7,280,398 B1 | 10/2007 | Lee et al. |
| 7,280,409 B2 | 10/2007 | Misumi et al. |
| 7,280,415 B2 | 10/2007 | Hwang et al. |
| 7,283,399 B2 | 10/2007 | Ishii et al. |
| 7,289,344 B2 | 10/2007 | Chen |
| 7,301,807 B2 | 11/2007 | Khalid et al. |
| 7,301,817 B2 | 11/2007 | Li et al. |
| 7,308,525 B2 | 12/2007 | Lasser et al. |
| 7,310,255 B2 | 12/2007 | Chan |
| 7,310,269 B2 | 12/2007 | Shibata |
| 7,310,271 B2 | 12/2007 | Lee |
| 7,310,272 B1 | 12/2007 | Mokhesi et al. |
| 7,310,347 B2 | 12/2007 | Lasser |
| 7,312,727 B1 | 12/2007 | Feng et al. |
| 7,321,509 B2 | 1/2008 | Chen et al. |
| 7,328,384 B1 | 2/2008 | Kulkarni et al. |
| 7,342,831 B2 | 3/2008 | Mokhlesi et al. |
| 7,343,330 B1 | 3/2008 | Boesjes et al. |
| 7,345,924 B2 | 3/2008 | Nguyen et al. |
| 7,345,928 B2 | 3/2008 | Li |
| 7,349,263 B2 | 3/2008 | Kim et al. |
| 7,356,755 B2 | 4/2008 | Fackenthal |
| 7,363,420 B2 | 4/2008 | Lin et al. |
| 7,365,671 B1 | 4/2008 | Anderson |
| 7,388,781 B2 | 6/2008 | Litsyn et al. |
| 7,397,697 B2 | 7/2008 | So et al. |
| 7,405,974 B2 | 7/2008 | Yaoi et al. |
| 7,405,979 B2 | 7/2008 | Ishii et al. |
| 7,408,804 B2 | 8/2008 | Hemink et al. |
| 7,408,810 B2 | 8/2008 | Aritome et al. |
| 7,409,473 B2 | 8/2008 | Conley et al. |
| 7,409,623 B2 | 8/2008 | Baker et al. |
| 7,420,847 B2 | 9/2008 | Li |
| 7,433,231 B2 | 10/2008 | Aritome |
| 7,433,697 B2 | 10/2008 | Karaoguz et al. |
| 7,434,111 B2 | 10/2008 | Sugiura et al. |
| 7,437,498 B2 | 10/2008 | Ronen |
| 7,440,324 B2 | 10/2008 | Mokhlesi |
| 7,440,331 B2 | 10/2008 | Hemink |
| 7,441,067 B2 | 10/2008 | Gorobetz et al. |
| 7,447,970 B2 | 11/2008 | Wu et al. |
| 7,450,421 B2 | 11/2008 | Mokhlesi et al. |
| 7,453,737 B2 | 11/2008 | Ha |
| 7,457,163 B2 | 11/2008 | Hemink |
| 7,457,897 B1 | 11/2008 | Lee et al. |
| 7,460,410 B2 | 12/2008 | Nagai et al. |
| 7,460,412 B2 | 12/2008 | Lee et al. |
| 7,466,592 B2 | 12/2008 | Mitani et al. |
| 7,468,907 B2 | 12/2008 | Kang et al. |
| 7,468,911 B2 | 12/2008 | Lutze et al. |
| 7,469,049 B1 | 12/2008 | Feng |
| 7,471,581 B2 | 12/2008 | Tran et al. |
| 7,483,319 B2 | 1/2009 | Brown |
| 7,487,329 B2 | 2/2009 | Hepkin et al. |
| 7,487,394 B2 | 2/2009 | Forhan et al. |
| 7,492,641 B2 | 2/2009 | Hosono et al. |
| 7,508,710 B2 | 3/2009 | Mokhlesi |
| 7,526,711 B2 | 4/2009 | Orio |
| 7,539,061 B2 | 5/2009 | Lee |
| 7,539,062 B2 | 5/2009 | Doyle |
| 7,551,492 B2 | 6/2009 | Kim |
| 7,558,109 B2 | 7/2009 | Brandman et al. |
| 7,558,839 B1 | 7/2009 | McGovern |
| 7,568,135 B2 | 7/2009 | Cornwell et al. |
| 7,570,520 B2 | 8/2009 | Kamei et al. |
| 7,574,555 B2 | 8/2009 | Porat et al. |
| 7,590,002 B2 | 9/2009 | Mokhlesi et al. |
| 7,593,259 B2 | 9/2009 | Kim et al. |
| 7,594,093 B1 | 9/2009 | Kancherla |
| 7,596,707 B1 | 9/2009 | Vemula |
| 7,609,787 B2 | 10/2009 | Jahan et al. |
| 7,613,043 B2 | 11/2009 | Cornwell et al. |
| 7,616,498 B2 | 11/2009 | Mokhlesi et al. |
| 7,619,918 B2 | 11/2009 | Aritome |
| 7,631,245 B2 | 12/2009 | Lasser |
| 7,633,798 B2 | 12/2009 | Sarin et al. |
| 7,633,802 B2 | 12/2009 | Mokhlesi |

| | | |
|---|---|---|
| 7,639,532 B2 | 12/2009 | Roohparvar et al. |
| 7,644,347 B2 | 1/2010 | Alexander et al. |
| 7,656,734 B2 | 2/2010 | Thorp et al. |
| 7,660,158 B2 | 2/2010 | Aritome |
| 7,660,183 B2 | 2/2010 | Ware et al. |
| 7,661,000 B2 | 2/2010 | Ueda et al. |
| 7,661,054 B2 | 2/2010 | Huffman et al. |
| 7,665,007 B2 | 2/2010 | Yang et al. |
| 7,680,987 B1 | 3/2010 | Clark et al. |
| 7,733,712 B1 | 6/2010 | Walston et al. |
| 7,742,351 B2 | 6/2010 | Inoue et al. |
| 7,761,624 B2 | 7/2010 | Karamcheti et al. |
| 7,797,609 B2 | 9/2010 | Neuman |
| 7,810,017 B2 | 10/2010 | Radke |
| 7,848,149 B2 | 12/2010 | Gonzalez et al. |
| 7,869,273 B2 | 1/2011 | Lee et al. |
| 7,885,119 B2 | 2/2011 | Li |
| 7,904,783 B2 | 3/2011 | Brandman et al. |
| 7,928,497 B2 | 4/2011 | Yaegashi |
| 7,929,549 B1 | 4/2011 | Talbot |
| 7,930,515 B2 | 4/2011 | Gupta et al. |
| 7,945,825 B2 | 5/2011 | Cohen et al. |
| 7,978,516 B2 | 7/2011 | Olbrich et al. |
| 7,995,388 B1 * | 8/2011 | Winter et al. ............ 365/185.03 |
| 8,014,094 B1 | 9/2011 | Jin |
| 8,037,380 B2 | 10/2011 | Cagno et al. |
| 8,040,744 B2 | 10/2011 | Gorobets et al. |
| 8,065,583 B2 | 11/2011 | Radke |
| 2001/0002172 A1 | 5/2001 | Tanaka et al. |
| 2001/0006479 A1 | 7/2001 | Ikehashi et al. |
| 2002/0038440 A1 | 3/2002 | Barkan |
| 2002/0056064 A1 | 5/2002 | Kidorf et al. |
| 2002/0118574 A1 | 8/2002 | Gongwer et al. |
| 2002/0133684 A1 | 9/2002 | Anderson |
| 2002/0166091 A1 | 11/2002 | Kidorf et al. |
| 2002/0174295 A1 | 11/2002 | Ulrich et al. |
| 2002/0196510 A1 | 12/2002 | Hietala et al. |
| 2003/0002348 A1 | 1/2003 | Chen et al. |
| 2003/0103400 A1 | 6/2003 | Van Tran |
| 2003/0161183 A1 | 8/2003 | Van Tran |
| 2003/0189856 A1 | 10/2003 | Cho et al. |
| 2004/0057265 A1 | 3/2004 | Mirabel et al. |
| 2004/0057285 A1 | 3/2004 | Cernea et al. |
| 2004/0083333 A1 | 4/2004 | Chang et al. |
| 2004/0083334 A1 | 4/2004 | Chang et al. |
| 2004/0105311 A1 | 6/2004 | Cernea et al. |
| 2004/0114437 A1 | 6/2004 | Li |
| 2004/0160842 A1 | 8/2004 | Fukiage |
| 2004/0223371 A1 | 11/2004 | Roohparvar |
| 2005/0007802 A1 | 1/2005 | Gerpheide |
| 2005/0013165 A1 | 1/2005 | Ban |
| 2005/0024941 A1 | 2/2005 | Lasser et al. |
| 2005/0024978 A1 | 2/2005 | Ronen |
| 2005/0030788 A1 | 2/2005 | Parkinson et al. |
| 2005/0086574 A1 | 4/2005 | Fackenthal |
| 2005/0121436 A1 | 6/2005 | Kamitani et al. |
| 2005/0144361 A1 | 6/2005 | Gonzalez et al. |
| 2005/0157555 A1 | 7/2005 | Ono et al. |
| 2005/0162913 A1 | 7/2005 | Chen |
| 2005/0169051 A1 | 8/2005 | Khalid et al. |
| 2005/0189649 A1 | 9/2005 | Maruyama et al. |
| 2005/0213393 A1 | 9/2005 | Lasser |
| 2005/0224853 A1 | 10/2005 | Ohkawa |
| 2005/0240745 A1 | 10/2005 | Iyer et al. |
| 2005/0243626 A1 | 11/2005 | Ronen |
| 2006/0004952 A1 | 1/2006 | Lasser |
| 2006/0028875 A1 | 2/2006 | Avraham et al. |
| 2006/0028877 A1 | 2/2006 | Meir |
| 2006/0101193 A1 | 5/2006 | Murin |
| 2006/0106972 A1 | 5/2006 | Gorobets et al. |
| 2006/0107136 A1 | 5/2006 | Gongwer et al. |
| 2006/0129750 A1 | 6/2006 | Lee et al. |
| 2006/0133141 A1 | 6/2006 | Gorobets |
| 2006/0156189 A1 | 7/2006 | Tomlin |
| 2006/0179334 A1 | 8/2006 | Brittain et al. |
| 2006/0190699 A1 | 8/2006 | Lee |
| 2006/0203546 A1 | 9/2006 | Lasser |
| 2006/0218359 A1 | 9/2006 | Sanders et al. |
| 2006/0221692 A1 | 10/2006 | Chen |
| 2006/0221705 A1 | 10/2006 | Hemink et al. |
| 2006/0221714 A1 | 10/2006 | Li et al. |
| 2006/0239077 A1 | 10/2006 | Park et al. |
| 2006/0239081 A1 | 10/2006 | Roohparvar |
| 2006/0256620 A1 | 11/2006 | Nguyen et al. |
| 2006/0256626 A1 | 11/2006 | Werner et al. |
| 2006/0256891 A1 | 11/2006 | Yuan et al. |
| 2006/0271748 A1 | 11/2006 | Jain et al. |
| 2006/0285392 A1 | 12/2006 | Incarnati et al. |
| 2006/0285396 A1 | 12/2006 | Ha |
| 2007/0006013 A1 | 1/2007 | Moshayedi et al. |
| 2007/0019481 A1 | 1/2007 | Park |
| 2007/0033581 A1 | 2/2007 | Tomlin et al. |
| 2007/0047314 A1 | 3/2007 | Goda et al. |
| 2007/0047326 A1 | 3/2007 | Nguyen et al. |
| 2007/0050536 A1 | 3/2007 | Kolokowsky |
| 2007/0058446 A1 | 3/2007 | Hwang et al. |
| 2007/0061502 A1 | 3/2007 | Lasser et al. |
| 2007/0067667 A1 | 3/2007 | Ikeuchi et al. |
| 2007/0074093 A1 | 3/2007 | Lasser |
| 2007/0086239 A1 | 4/2007 | Litsyn et al. |
| 2007/0086260 A1 | 4/2007 | Sinclair |
| 2007/0089034 A1 | 4/2007 | Litsyn et al. |
| 2007/0091677 A1 | 4/2007 | Lasser et al. |
| 2007/0091694 A1 | 4/2007 | Lee et al. |
| 2007/0103978 A1 | 5/2007 | Conley et al. |
| 2007/0103986 A1 | 5/2007 | Chen |
| 2007/0104211 A1 | 5/2007 | Opsasnick |
| 2007/0109845 A1 | 5/2007 | Chen |
| 2007/0109849 A1 | 5/2007 | Chen |
| 2007/0115726 A1 | 5/2007 | Cohen et al. |
| 2007/0118713 A1 | 5/2007 | Guterman et al. |
| 2007/0143378 A1 | 6/2007 | Gorobetz |
| 2007/0143531 A1 | 6/2007 | Atri |
| 2007/0159889 A1 | 7/2007 | Kang et al. |
| 2007/0159892 A1 | 7/2007 | Kang et al. |
| 2007/0159907 A1 | 7/2007 | Kwak |
| 2007/0168837 A1 | 7/2007 | Murin |
| 2007/0171714 A1 | 7/2007 | Wu et al. |
| 2007/0183210 A1 | 8/2007 | Choi et al. |
| 2007/0189073 A1 | 8/2007 | Aritome |
| 2007/0195602 A1 | 8/2007 | Fong et al. |
| 2007/0206426 A1 | 9/2007 | Mokhlesi |
| 2007/0208904 A1 | 9/2007 | Hsieh et al. |
| 2007/0226599 A1 | 9/2007 | Motwani |
| 2007/0236990 A1 | 10/2007 | Aritome |
| 2007/0253249 A1 | 11/2007 | Kang et al. |
| 2007/0256620 A1 | 11/2007 | Viggiano et al. |
| 2007/0263455 A1 | 11/2007 | Cornwell et al. |
| 2007/0266232 A1 | 11/2007 | Rodgers et al. |
| 2007/0271424 A1 | 11/2007 | Lee et al. |
| 2007/0280000 A1 | 12/2007 | Fujiu et al. |
| 2007/0291571 A1 | 12/2007 | Balasundaram |
| 2007/0297234 A1 | 12/2007 | Cernea et al. |
| 2008/0010395 A1 | 1/2008 | Mylly et al. |
| 2008/0025121 A1 | 1/2008 | Tanzawa |
| 2008/0043535 A1 | 2/2008 | Roohparvar |
| 2008/0049504 A1 | 2/2008 | Kasahara et al. |
| 2008/0049506 A1 | 2/2008 | Guterman |
| 2008/0052446 A1 | 2/2008 | Lasser et al. |
| 2008/0055993 A1 | 3/2008 | Lee |
| 2008/0080243 A1 | 4/2008 | Edahiro et al. |
| 2008/0082730 A1 | 4/2008 | Kim et al. |
| 2008/0089123 A1 | 4/2008 | Chae et al. |
| 2008/0104309 A1 | 5/2008 | Cheon et al. |
| 2008/0104312 A1 | 5/2008 | Lasser |
| 2008/0109590 A1 | 5/2008 | Jung et al. |
| 2008/0115017 A1 | 5/2008 | Jacobson |
| 2008/0123420 A1 | 5/2008 | Brandman et al. |
| 2008/0123426 A1 | 5/2008 | Lutze et al. |
| 2008/0126686 A1 | 5/2008 | Sokolov et al. |
| 2008/0130341 A1 | 6/2008 | Shalvi et al. |
| 2008/0148115 A1 | 6/2008 | Sokolov et al. |
| 2008/0151618 A1 | 6/2008 | Sharon et al. |
| 2008/0151667 A1 | 6/2008 | Miu et al. |
| 2008/0158958 A1 | 7/2008 | Sokolov et al. |
| 2008/0181001 A1 | 7/2008 | Shalvi |
| 2008/0198650 A1 | 8/2008 | Shalvi et al. |
| 2008/0198654 A1 | 8/2008 | Toda |

| | | |
|---|---|---|
| 2008/0209116 A1 | 8/2008 | Caulkins |
| 2008/0209304 A1 | 8/2008 | Winarski et al. |
| 2008/0215798 A1 | 9/2008 | Sharon et al. |
| 2008/0219050 A1 | 9/2008 | Shalvi et al. |
| 2008/0239093 A1 | 10/2008 | Easwar et al. |
| 2008/0239812 A1 | 10/2008 | Abiko et al. |
| 2008/0253188 A1 | 10/2008 | Aritome |
| 2008/0263262 A1 | 10/2008 | Sokolov et al. |
| 2008/0263676 A1 | 10/2008 | Mo et al. |
| 2008/0270730 A1 | 10/2008 | Lasser et al. |
| 2008/0282106 A1 | 11/2008 | Shalvi et al. |
| 2008/0288714 A1 | 11/2008 | Salomon et al. |
| 2009/0013233 A1 | 1/2009 | Radke |
| 2009/0024905 A1 | 1/2009 | Shalvi et al. |
| 2009/0034337 A1 | 2/2009 | Aritome |
| 2009/0043831 A1 | 2/2009 | Antonopoulos et al. |
| 2009/0043951 A1 | 2/2009 | Shalvi et al. |
| 2009/0049234 A1 | 2/2009 | Oh et al. |
| 2009/0073762 A1 | 3/2009 | Lee et al. |
| 2009/0086542 A1 | 4/2009 | Lee et al. |
| 2009/0089484 A1 | 4/2009 | Chu |
| 2009/0091979 A1 | 4/2009 | Shalvi |
| 2009/0094930 A1 | 4/2009 | Schwoerer |
| 2009/0106485 A1 | 4/2009 | Anholt |
| 2009/0112949 A1 | 4/2009 | Ergan et al. |
| 2009/0132755 A1 | 5/2009 | Radke |
| 2009/0144600 A1 | 6/2009 | Perlmutter et al. |
| 2009/0150894 A1 | 6/2009 | Huang et al. |
| 2009/0157950 A1 | 6/2009 | Selinger |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0172257 A1 | 7/2009 | Prins et al. |
| 2009/0172261 A1 | 7/2009 | Prins et al. |
| 2009/0193184 A1 | 7/2009 | Yu et al. |
| 2009/0199074 A1 | 8/2009 | Sommer et al. |
| 2009/0204824 A1 | 8/2009 | Lin et al. |
| 2009/0204872 A1 | 8/2009 | Yu et al. |
| 2009/0213653 A1 | 8/2009 | Perlmutter et al. |
| 2009/0213654 A1 | 8/2009 | Perlmutter et al. |
| 2009/0225595 A1 | 9/2009 | Kim |
| 2009/0228761 A1 | 9/2009 | Perlmutter et al. |
| 2009/0265509 A1 | 10/2009 | Klein |
| 2009/0300227 A1 | 12/2009 | Nochimowski et al. |
| 2009/0323412 A1 | 12/2009 | Mokhlesi et al. |
| 2009/0327608 A1 | 12/2009 | Eschmann |
| 2010/0017650 A1 | 1/2010 | Chin et al. |
| 2010/0034022 A1 | 2/2010 | Dutta et al. |
| 2010/0057976 A1 | 3/2010 | Lasser |
| 2010/0061151 A1 | 3/2010 | Miwa et al. |
| 2010/0082883 A1 | 4/2010 | Chen et al. |
| 2010/0083247 A1 | 4/2010 | Kanevsky et al. |
| 2010/0110580 A1 | 5/2010 | Takashima |
| 2010/0131697 A1 | 5/2010 | Alrod et al. |
| 2010/0142268 A1 | 6/2010 | Aritome |
| 2010/0142277 A1 | 6/2010 | Yang et al. |
| 2010/0169547 A1 | 7/2010 | Ou |
| 2010/0169743 A1 | 7/2010 | Vogan et al. |
| 2010/0174847 A1 | 7/2010 | Paley et al. |
| 2010/0211803 A1 | 8/2010 | Lablans |
| 2010/0287217 A1 | 11/2010 | Borchers et al. |
| 2011/0010489 A1 | 1/2011 | Yeh |
| 2011/0060969 A1 | 3/2011 | Ramamoorthy et al. |
| 2011/0066793 A1 | 3/2011 | Burd |
| 2011/0075482 A1 | 3/2011 | Shepard et al. |
| 2011/0107049 A1 | 5/2011 | Kwon et al. |
| 2011/0149657 A1* | 6/2011 | Haratsch et al. ......... 365/185.18 |
| 2011/0199823 A1 | 8/2011 | Bar-Or et al. |
| 2011/0302354 A1 | 12/2011 | Miller |

FOREIGN PATENT DOCUMENTS

| | | |
|---|---|---|
| EP | 1434236 B1 | 6/2004 |
| EP | 1605509 A1 | 12/2005 |
| WO | 9610256 A1 | 4/1996 |
| WO | 9828745 A1 | 7/1998 |
| WO | 02100112 A1 | 12/2002 |
| WO | 03100791 A1 | 12/2003 |
| WO | 2007046084 A2 | 4/2007 |
| WO | 2007132452 A2 | 11/2007 |
| WO | 2007132453 A2 | 11/2007 |
| WO | 2007132456 A2 | 11/2007 |
| WO | 2007132457 A2 | 11/2007 |
| WO | 2007132458 A2 | 11/2007 |
| WO | 2007146010 A2 | 12/2007 |
| WO | 2008026203 A2 | 3/2008 |
| WO | 2008053472 A2 | 5/2008 |
| WO | 2008053473 A2 | 5/2008 |
| WO | 2008068747 A2 | 6/2008 |
| WO | 2008077284 A1 | 7/2008 |
| WO | 2008083131 A2 | 7/2008 |
| WO | 2008099958 A1 | 8/2008 |
| WO | 2008111058 A2 | 9/2008 |
| WO | 2008124760 A2 | 10/2008 |
| WO | 2008139441 A2 | 11/2008 |
| WO | 2009037691 A2 | 3/2009 |
| WO | 2009037697 A2 | 3/2009 |
| WO | 2009038961 A2 | 3/2009 |
| WO | 2009050703 A2 | 4/2009 |
| WO | 2009053961 A2 | 4/2009 |
| WO | 2009053962 A2 | 4/2009 |
| WO | 2009053963 A2 | 4/2009 |
| WO | 2009063450 A2 | 5/2009 |
| WO | 2009072100 A2 | 6/2009 |
| WO | 2009072101 A2 | 6/2009 |
| WO | 2009072102 A2 | 6/2009 |
| WO | 2009072103 A2 | 6/2009 |
| WO | 2009072104 A2 | 6/2009 |
| WO | 2009072105 A2 | 6/2009 |
| WO | 2009074978 A2 | 6/2009 |
| WO | 2009074979 A2 | 6/2009 |
| WO | 2009078006 A2 | 6/2009 |
| WO | 2009095902 A2 | 8/2009 |
| WO | 2011024015 A1 | 3/2011 |

OTHER PUBLICATIONS

U.S. Appl. No. 12/332,368 Office Action dated Nov. 10, 2011.
U.S. Appl. No. 12/063,544 Office Action dated Dec. 14, 2011.
U.S. Appl. No. 12/186,867 Office Action dated Jan. 17, 2012.
U.S. Appl. No. 12/119,069 Office Action dated Nov. 14, 2011.
U.S. Appl. No. 12/037,487 Office Action dated Jan. 3, 2012.
U.S. Appl. No. 11/995,812 Office Action dated Oct. 28, 2011.
U.S. Appl. No. 12/551,567 Office Action dated Oct. 27, 2011.
U.S. Appl. No. 12/618,732 Office Action dated Nov. 4, 2011.
U.S. Appl. No. 12/649,382 Office Action dated Jan. 6, 2012.
U.S. Appl. No. 13/284,909, filed Oct. 30, 2011.
U.S. Appl. No. 13/284,913, filed Oct. 30, 2011.
U.S. Appl. No. 13/338,335, filed Dec. 28, 2011.
U.S. Appl. No. 13/355,536, filed Jan. 22, 2012.
Kim et al., "Multi-bit Error Tolerant Caches Using Two-Dimensional Error Coding", Proceedings of the 40th Annual ACM/IEEE International Symposium on Microarchitecture (MICRO-40), Chicago, USA, Dec. 1-5, 2007.
U.S. Appl. No. 11/995,814 Official Action dated Dec. 17, 2010.
U.S. Appl. No. 12/388,528 Official Action dated Nov. 29, 2010.
U.S. Appl. No. 12/251,471 Official Action dated Jan. 3, 2011.
Engineering Windows 7, "Support and Q&A for Solid-State Drives", e7blog, May 5, 2009.
Micron Technology Inc., "Memory Management in NAND Flash Arrays", Technical Note, year 2005.
Kang et al., "A Superblock-based Flash Translation Layer for NAND Flash Memory", Proceedings of the 6th ACM & IEEE International Conference on Embedded Software, pp. 161-170, Seoul, Korea, Oct. 22-26, 2006.
Park et al., "Sub-Grouped Superblock Management for High-Performance Flash Storages", IEICE Electronics Express, vol. 6, No. 6, pp. 297-303, Mar. 25, 2009.
"How to Resolve "Bad Super Block: Magic Number Wrong" in BSD", Free Online Articles Director Article Base, posted Sep. 5, 2009.
UBUNTU Forums, "Memory Stick Failed IO Superblock", posted Nov. 11, 2009.
Super User Forums, "SD Card Failure, can't read superblock", posted Aug. 8, 2010.
U.S. Appl. No. 12/987,174, filed Jan. 10, 2011.

U.S. Appl. No. 12/987,175, filed Jan. 10, 2011.
U.S. Appl. No. 12/963,649, filed Dec. 9, 2010.
U.S. Appl. No. 13/021,754, filed Feb. 6, 2011.
U.S. Appl. No. 12/019,011 Official Action dated Nov. 20, 2009.
Takeuchi et al., "A Multipage Cell Architecture for High-Speed Programming Multilevel NAND Flash Memories", IEEE Journal of Solid State Circuits, vol. 33, No. 8, Aug. 1998.
Jedec Standard JESD84-C44, "Embedded MultiMediaCard (e•MMC) Mechanical Standard, with Optional Reset Signal", Jedec Solid State Technology Association, USA, Jul. 2009.
Jedec, "UFS Specification", version 0.1, Nov. 11, 2009.
SD Group and SD Card Association, "SD Specifications Part 1 Physical Layer Specification", version 3.01, draft 1.00, Nov. 9, 2009.
Compaq et al., "Universal Serial Bus Specification", revision 2.0, Apr. 27, 2000.
Serial ATA International Organization, "Serial ATA Revision 3.0 Specification", Jun. 2, 2009.
Gotou, H., "An Experimental Confirmation of Automatic Threshold Voltage Convergence in a Flash Memory Using Alternating Word-Line Voltage Pulses", IEEE Electron Device Letters, vol. 18, No. 10, pp. 503-505, Oct. 1997.
U.S. Appl. No. 12/534,898 Official Action dated Mar. 23, 2011.
U.S. Appl. No. 13/047,822, filed Mar. 15, 2011.
U.S. Appl. No. 13/069,406, filed Mar. 23, 2011.
U.S. Appl. No. 13/088,361, filed Apr. 17, 2011.
Ankolekar et al., "Multibit Error-Correction Methods for Latency-Constrained Flash Memory Systems", IEEE Transactions on Device and Materials Reliability, vol. 10, No. 1, pp. 33-39, Mar. 2010.
U.S. Appl. No. 12/344,233 Official Action dated Jun. 24, 2011.
U.S. Appl. No. 11/995,813 Official Action dated Jun. 16, 2011.
Berman et al., "Mitigating Inter-Cell Coupling Effects in MLC NAND Flash via Constrained Coding", Flash Memory Summit, Santa Clara, USA, Aug. 19, 2010.
U.S. Appl. No. 12/178,318 Official Action dated May 31, 2011.
CN Patent Application # 200780026181.3 Official Action dated Apr. 8, 2011.
Huffman, A., "Non-Volatile Memory Host Controller Interface (NVMHCI)", Specification 1.0, Apr. 14, 2008.
Panchbhai et al., "Improving Reliability of NAND Based Flash Memory Using Hybrid SLC/MLC Device", Project Proposal for CSci 8980—Advanced Storage Systems, University of Minnesota, USA, Spring 2009.
U.S. Appl. No. 11/957,970 Official Action dated May 20, 2010.
Shalvi et al., U.S. Appl. No. 12/822,207 "Adaptive Over-Provisioning in Memory Systems" filed on Jun. 24, 2010.
Agrell et al., "Closest Point Search in Lattices", IEEE Transactions on Information Theory, vol. 48, No. 8, pp. 2201-2214, Aug. 2002.
Bez et al., "Introduction to Flash memory", Proceedings of the IEEE, vol. 91, No. 4, pp. 489-502, Apr. 2003.
Blahut, R.E., "Theory and Practice of Error Control Codes," Addison-Wesley, May, 1984, section 3.2, pp. 47-48.
Chang, L., "Hybrid Solid State Disks: Combining Heterogeneous NAND Flash in Large SSDs", ASPDAC, Jan. 2008.
Cho et al., "Multi-Level NAND Flash Memory with Non-Uniform Threshold Voltage Distribution," IEEE International Solid-State Circuits Conference (ISSCC), San Francisco, CA, Feb. 5-7, 2001, pp. 28-29 and 424.
Databahn™, "Flash memory controller IP", Denali Software, Inc., 1994 https://www.denali.com/en/products/databahn_flash.jsp.
Datalight, Inc., "FlashFX Pro 3.1 High Performance Flash Manager for Rapid Development of Reliable Products", Nov. 16, 2006.
Duann, N., Silicon Motion Presentation "SLC & MLC Hybrid", Flash Memory Summit, Santa Clara, USA, Aug. 2008.
Eitan et al., "Can NROM, a 2-bit, Trapping Storage NVM Cell, Give a Real Challenge to Floating Gate Cells?", Proceedings of the 1999 International Conference on Solid State Devices and Materials (SSDM), pp. 522-524, Tokyo, Japan 1999.
Eitan et al., "Multilevel Flash Cells and their Trade-Offs", Proceedings of the 1996 IEEE International Electron Devices Meeting (IEDM), pp. 169-172, New York, USA 1996.

Engh et al., "A self adaptive programming method with 5 mV accuracy for multi-level storage in FLASH", pp. 115-118, Proceedings of the IEEE 2002 Custom Integrated Circuits Conference, May 12-15, 2002.
Goodman et al., "On-Chip ECC for Multi-Level Random Access Memories," Proceedings of the IEEE/CAM Information Theory Workshop, Ithaca, USA, Jun. 25-29, 1989.
Han et al., "An Intelligent Garbage Collection Algorithm for Flash Memory Storages", Computational Science and Its Applications—ICCSA 2006, vol. 3980/2006, pp. 1019-1027, Springer Berlin / Heidelberg, Germany, May 11, 2006.
Han et al., "CATA: A Garbage Collection Scheme for Flash Memory File Systems", Ubiquitous Intelligence and Computing, vol. 4159/2006, pp. 103-112, Springer Berlin / Heidelberg, Aug. 25, 2006.
Horstein, "On the Design of Signals for Sequential and Nonsequential Detection Systems with Feedback," IEEE Transactions on Information Theory IT-12:4 (Oct. 1966), pp. 448-455.
Jung et al., in "A 117 mm.sup.2 3.3V Only 128 Mb Multilevel NAND Flash Memory for Mass Storage Applications," IEEE Journal of Solid State Circuits, (11:31), Nov. 1996, pp. 1575-1583.
Kawaguchi et al. 1995. A flash-memory based file system. In Proceedings of the USENIX 1995 Technical Conference , New Orleans, Louisiana. 155-164.
Kim et al., "Future Memory Technology including Emerging New Memories", Proceedings of the 24th International Conference on Microelectronics (MIEL), vol. 1, pp. 377-384, Nis, Serbia and Montenegro, May 16-19, 2004.
Lee et al., "Effects of Floating Gate Interference on Nand Flash Memory Cell Operation", IEEE Electron Device Letters, vol. 23, No. 5, pp. 264-266, May 2002.
Maayan et al., "A 512 Mb NROM Flash Data Storage Memory with 8 MB/s Data Rate", Proceedings of the 2002 IEEE International Solid-State circuits Conference (ISSCC 2002), pp. 100-101, San Francisco, USA, Feb. 3-7, 2002.
Mielke et al., "Recovery Effects in the Distributed Cycling of Flash Memories", IEEE 44th Annual International Reliability Physics Symposium, pp. 29-35, San Jose, USA, Mar. 2006.
Onfi, "Open NAND Flash Interface Specification," revision 1.0, Dec. 28, 2006.
Phison Electronics Corporation, "PS8000 Controller Specification (for SD Card)", revision 1.2, Document No. S-07018, Mar. 28, 2007.
Shalvi, et al., "Signal Codes," Proceedings of the 2003 IEEE Information Theory Workshop (ITW'2003), Paris, France, Mar. 31-Apr. 4, 2003.
Shiozaki, A., "Adaptive Type-II Hybrid Broadcast ARQ System", IEEE Transactions on Communications, vol. 44, Issue 4, pp. 420-422, Apr. 1996.
Suh et al., "A 3.3V 32Mb NAND Flash Memory with Incremental Step Pulse Programming Scheme", IEEE Journal of Solid-State Circuits, vol. 30, No. 11, pp. 1149-1156, Nov. 1995.
ST Microelectronics, "Bad Block Management in NAND Flash Memories", Application note AN-1819, Geneva, Switzerland, May 2004.
ST Microelectronics, "Wear Leveling in Single Level Cell NAND Flash Memories," Application note AN-1822 Geneva, Switzerland, Feb. 2007.
Takeuchi et al., "A Double Level $V_{TH}$ Select Gate Array Architecture for Multi-Level NAND Flash Memories", Digest of Technical Papers, 1995 Symposium on VLSI Circuits, pp. 69-70, Jun. 8-10, 1995.
Wu et al., "eNVy: A non-Volatile, Main Memory Storage System", Proceedings of the 6th International Conference on Architectural support for programming languages and operating systems, pp. 86-87, San Jose, USA, 1994.
International Application PCT/IL2007/000575 Patentability report dated Mar. 26, 2009.
International Application PCT/IL2007/000575 Search Report dated May 30, 2008.
International Application PCT/IL2007/000576 Patentability Report dated Mar. 19, 2009.
International Application PCT/IL2007/000576 Search Report dated Jul. 7, 2008.

International Application PCT/IL2007/000579 Patentability report dated Mar. 10, 2009.
International Application PCT/IL2007/000579 Search report dated Jul. 3, 2008.
International Application PCT/IL2007/000580 Patentability Report dated Mar. 10, 2009.
International Application PCT/IL2007/000580 Search Report dated Sep. 11, 2008.
International Application PCT/IL2007/000581 Patentability Report dated Mar. 26, 2009.
International Application PCT/IL2007/000581 Search Report dated Aug. 25, 2008.
International Application PCT/IL2007/001059 Patentability report dated Apr. 19, 2009.
International Application PCT/IL2007/001059 Search report dated Aug. 7, 2008.
International Application PCT/IL2007/001315 search report dated Aug. 7, 2008.
International Application PCT/IL2007/001315 Patentability Report dated May 5, 2009.
International Application PCT/IL2007/001316 Search report dated Jul. 22, 2008.
International Application PCT/IL2007/001316 Patentability Report dated May 5, 2009.
International Application PCT/IL2007/001488 Search report dated Jun. 20, 2008.
International Application PCT/IL2008/000329 Search report dated Nov. 25, 2008.
International Application PCT/IL2008/000519 Search report dated Nov. 20, 2008.
International Application PCT/IL2008/001188 Search Report dated Jan. 28, 2009.
International Application PCT/IL2008/001356 Search Report dated Feb. 3, 2009.
International Application PCT/IL2008/001446 Search report dated Feb. 20, 2009.
Perlmutter et al., U.S. Appl. No. 12/405,275 "Memory Device with Multiple-Accuracy Read Commands" filed on Mar. 17, 2009.
Sommer, N., U.S. Appl. No. 12/171,797 "Memory Device with Non-Uniform Programming Levels" filed Jul. 11, 2008.
Shalvi et al., U.S. Appl. No. 12/251,471 "Compensation for Voltage Drifts in Analog Memory Cells" filed Oct. 15, 2008.
U.S. Appl. No. 11/949,135 Official Action dated Oct. 2, 2009.
Wei, L., "Trellis-Coded Modulation With Multidimensional Constellations", IEEE Transactions on Information Theory, vol. IT-33, No. 4, pp. 483-501, Jul. 1987.
U.S. Appl. No. 13/114,049 Official Action dated Sep 12, 2011.
U.S. Appl. No. 12/405,275 Official Action dated Jul. 29, 2011.
Conway et al., "Sphere Packings, Lattices and Groups", 3rd edition, chapter 4, pp. 94-135, Springer, New York, USA 1998.
Chinese Patent Application # 200780040493.X Official Action dated Jun. 15, 2011.
U.S. Appl. No. 12/037,487 Official Action dated Oct. 3, 2011.
U.S. Appl. No. 12/649,360 Official Action dated Aug. 9, 2011.
U.S. Appl. No. 13/192,504, filed Jul. 28, 2011.
U.S. Appl. No. 13/192,852, filed Aug. 2, 2011.
U.S. Appl. No. 13/231,963, filed Sep. 14, 2011.
U.S. Appl. No. 13/239,408, filed Sep. 22, 2011.
U.S. Appl. No. 13/239,411, filed Sep. 22, 2011.
U.S. Appl. No. 13/214,257, filed Aug. 22, 2011.
U.S. Appl. No. 13/192,501, filed Jul. 28, 2011.
U.S. Appl. No. 13/192,495, filed Jul. 28, 2011.
U.S. Appl. No. 12/880,101 "Reuse of Host Hibernation Storage Space by Memory Controller", filed Sep. 12, 2010.
U.S. Appl. No. 12/890,724 "Error Correction Coding Over Multiple Memory Pages", filed Sep. 27, 2010.
U.S. Appl. No. 12/171,797 Official Action dated Aug. 25, 2010.
U.S. Appl. No. 12/497,707 Official Action dated Sep. 15, 2010.
U.S. Appl. No. 11/995,801 Official Action dated Oct. 15, 2010.
Numonyx, "M25PE16: 16-Mbit, page-erasable serial flash memory with byte-alterability, 75 MHz SPI bus, standard pinout", Apr. 2008.
Hong et al., "NAND Flash-based Disk Cache Using SLC/MLC Combined Flash Memory", 2010 International Workshop on Storage Network Architecture and Parallel I/Os, pp. 21-30, USA, May 3, 2010.
U.S. Appl. No. 11/945,575 Official Action dated Aug. 24, 2010.
U.S. Appl. No. 12/045,520 Official Action dated Nov. 16, 2010.
U.S. Appl. No. 12/323,544 Official Action dated Mar. 9, 2012.
Chinese Patent Application # 200780026181.3 Official Action dated Mar. 7, 2012.
Chinese Patent Application # 200780026094.8 Official Action dated Feb. 2, 2012.
U.S. Appl. No. 12/332,370 Official Action dated Mar. 8, 2012.
U.S. Appl. No. 12/579,432 Official Action dated Feb. 29, 2012.
U.S. Appl. No. 12/522,175 Official Action dated Mar. 27, 2012.
U.S. Appl. No. 12/607,085 Official Action dated Mar. 28, 2012.
Budilovsky et al., "Prototyping a High-Performance Low-Cost Solid-State Disk", SYSTOR—The 4th Annual International Systems and Storage Conference, Haifa, Israel, May 30-Jun. 1, 2011.
NVM Express Protocol, "NVM Express", Revision 1.0b, Jul. 12, 2011.
SCSI Protocol, "Information Technology—SCSI Architecture Model—5 (SAM-5)", INCITS document T10/2104-D, revision 01, Jan. 28, 2009.
SAS Protocol, "Information Technology—Serial Attached SCSI—2 (SAS-2)", INCITS document T10/1760-D, revision 15a, Feb. 22, 2009.
US 7,161,836, 01/2007, Wan et al. (withdrawn)

* cited by examiner

EFFICIENT READOUT FROM ANALOG MEMORY CELLS USING DATA COMPRESSION

CROSS-REFERENCE TO RELATED APPLICATIONS

This application claims the benefit of U.S. Provisional Patent Application 61/034,511, filed Mar. 7, 2008, U.S. Provisional Patent Application 61/052,276, filed May 12, 2008, and U.S. Provisional Patent Application 61/053,031, filed May 14, 2008, whose disclosure is incorporated herein by reference.

FIELD OF THE INVENTION

The present invention relates generally to memory devices, and particularly to methods and systems for reading data from analog memory cells.

BACKGROUND OF THE INVENTION

Several types of memory devices, such as Flash memories, use arrays of analog memory cells for storing data. Each analog memory cell holds a certain level of a given physical quantity such as an electrical charge or voltage, which represents the data stored in the cell. The levels of this physical quantity are also referred to as storage values or analog values. In Flash memories, for example, each analog memory cell holds a certain amount of electrical charge. The range of possible analog values is typically divided into regions, each region corresponding to a programming state that represents one or more data bit values. Data is written to an analog memory cell by writing a nominal analog value that corresponds to the desired bit or bits.

Some memory devices, which are commonly referred to as Single-Level Cell (SLC) devices, store a single bit of information in each memory cell, i.e., each memory cell can be programmed to assume two possible memory states. Higher-density devices, often referred to as Multi-Level Cell (MLC) devices, store two or more bits per memory cell, i.e., can be programmed to assume more than two possible memory states.

Flash memory devices are described, for example, by Bez et al., in "Introduction to Flash Memory," Proceedings of the IEEE, volume 91, number 4, April, 2003, pages 489-502, which is incorporated herein by reference. Multi-level Flash cells and devices are described, for example, by Eitan et al., in "Multilevel Flash Cells and their Trade-Offs," Proceedings of the 1996 IEEE International Electron Devices Meeting (IEDM), New York, N.Y., pages 169-172, which is incorporated herein by reference. The paper compares several kinds of multilevel Flash cells, such as common ground, DINOR, AND, NOR and NAND cells.

Eitan et al., describe another type of analog memory cell called Nitride Read Only Memory (NROM) in "Can NROM, a 2-bit, Trapping Storage NVM Cell, Give a Real Challenge to Floating Gate Cells?" Proceedings of the 1999 International Conference on Solid State Devices and Materials (SSDM), Tokyo, Japan, Sep. 21-24, 1999, pages 522-524, which is incorporated herein by reference. NROM cells are also described by Maayan et al., in "A 512 Mb NROM Flash Data Storage Memory with 8 MB/s Data Rate", Proceedings of the 2002 IEEE International Solid-State Circuits Conference (ISSCC 2002), San Francisco, Calif., Feb. 3-7, 2002, pages 100-101, which is incorporated herein by reference. Other exemplary types of analog memory cells are Floating Gate (FG) cells, Ferroelectric RAM (FRAM) cells, magnetic RAM (MRAM) cells, Charge Trap Flash (CTF) and phase change RAM (PRAM, also referred to as Phase Change Memory-PCM) cells. FRAM, MRAM and PRAM cells are described, for example, by Kim and Koh in "Future Memory Technology including Emerging New Memories," Proceedings of the $24^{th}$ International Conference on Microelectronics (MIEL), Nis, Serbia and Montenegro, May 16-19, 2004, volume 1, pages 377-384, which is incorporated herein by reference.

Data is sometimes read from memory cells using quality measures. For example, U.S. Pat. No. 6,751,766, whose disclosure is incorporated herein by reference, describes a memory system. The quality of data stored in the memory system is assessed by different methods, and the memory system is operated according to the assessed quality. The data quality can be assessed during read operations. Subsequent use of an Error Correction Code (ECC) can utilize the quality indications to detect and reconstruct the data with improved effectiveness. Alternatively, a statistics of data quality can be constructed and digital data values can be associated in a modified manner to prevent data corruption. In both cases, corrective actions can be implemented specifically on the poor quality data, according to suitably chosen schedules, and with improved effectiveness because of the knowledge provided by the quality indications.

SUMMARY OF THE INVENTION

An embodiment of the present invention provides a method for data storage, including:

storing data in a group of analog memory cells by writing respective input storage values to the memory cells in the group;

after storing the data, reading respective output storage values from the analog memory cells in the group;

estimating respective confidence levels of the output storage values;

compressing the confidence levels; and transferring the output storage values and the compressed confidence levels from the memory cells over an interface to a memory controller.

In some embodiments, the method further includes decompressing the transferred output storage values at the memory controller, and reconstructing the data responsively to the output storage values and the decompressed confidence levels. In a disclosed embodiment, storing the data includes encoding the data with an Error Correction Code (ECC), and reconstructing the data includes decoding the ECC responsively to the decompressed confidence levels. Decoding the ECC may include computing respective ECC metrics of the output storage values responsively to the confidence levels, and decoding the ECC responsively to the ECC metrics.

In an embodiment, the method includes refining at least some of the confidence levels, updating the ECC metrics based on the refined confidence levels and re-decoding the ECC responsively to the updated ECC metrics. Refining the confidence levels and updating the ECC metrics may include, at a first time, refining the confidence levels and updating the ECC metrics only responsively to a failure in decoding the ECC, and at a second time subsequent to the first time, refining the confidence levels and updating the ECC metrics before initially attempting to decode the ECC.

In another embodiment, refining the confidence levels includes refining the confidence levels of only a subset of the output storage values that were previously identified as having a low confidence level. In yet another embodiment, computing the ECC metrics includes marking some of the output storage values as erasures. In still another embodiment, reading the output storage values includes applying one or more first read thresholds to the analog memory cells in the group, and estimating the confidence levels includes re-reading the analog memory cells in the group using one or more second read thresholds, different from the first read thresholds.

In an embodiment, storing the data includes programming each of the analog memory cells in the group to a respective programming state selected from two or more programming states, and re-reading the analog memory cells includes identifying the output storage values contained in a boundary region separating two of the programming states. In another embodiment, reading the output storage values includes re-reading the output storage values multiple times to produce respective multiple sets of read results, and estimating the confidence levels includes determining differences between the respective read results in the multiple sets. Re-reading the output storage values may include producing a first set of the read results using a first read operation having a first accuracy level, and producing a second set of the read results using a second read operation having a second accuracy level, finer than the first accuracy level.

In some embodiments, estimating the confidence levels includes assigning some of the output storage value a low confidence level, and compressing and transferring the confidence levels include indicating to the memory controller only the output storage values having the low confidence level. In a disclosed embodiment, the interface includes a parallel bus having a signaling line, transferring the output storage values includes sending one or more of the output storage values during each cycle of the bus, and indicating the storage values having the low confidence level includes signaling over the signaling line when at least one of the output storage values sent during a given cycle has the low confidence level. In another embodiment, the interface includes a parallel bus having a signaling line, indicating the storage values having the low confidence level includes sending the storage values having the low confidence level over the signaling line, and transferring the output storage values includes sending the output storage values over lines other than the signaling line.

There is additionally provided, in accordance with an embodiment of the present invention, apparatus for data storage, including:

a plurality of analog memory cells; and circuitry, which is coupled to store data in a group of the analog memory cells by writing respective input storage values to the memory cells in the group, to read respective output storage values from the analog memory cells in the group after storing the data, to estimate respective confidence levels of the output storage values, to compress the confidence levels, and to transfer the output storage values and the compressed confidence levels from the memory cells over an interface to a memory controller.

There is also provided, in accordance with an embodiment of the present invention, apparatus for data storage, including:

a memory device, including:

a plurality of analog memory cells; and circuitry, which is coupled to store data in a group of the analog memory cells by writing respective input storage values to the memory cells in the group, to read respective output storage values from the analog memory cells in the group after storing the data, to estimate respective confidence levels of the output storage values, to compress the confidence levels, and to transfer the output storage values and the compressed confidence levels from the memory cells over an interface; and a memory controller, which is configured to receive the output storage values and the compressed confidence levels over the interface, to decompress the transferred output storage values and to reconstruct the data responsively to the output storage values and the decompressed confidence levels.

The present invention will be more fully understood from the following detailed description of the embodiments thereof, taken together with the drawings in which:

DETAILED DESCRIPTION OF EMBODIMENTS

Overview

Figure 1:
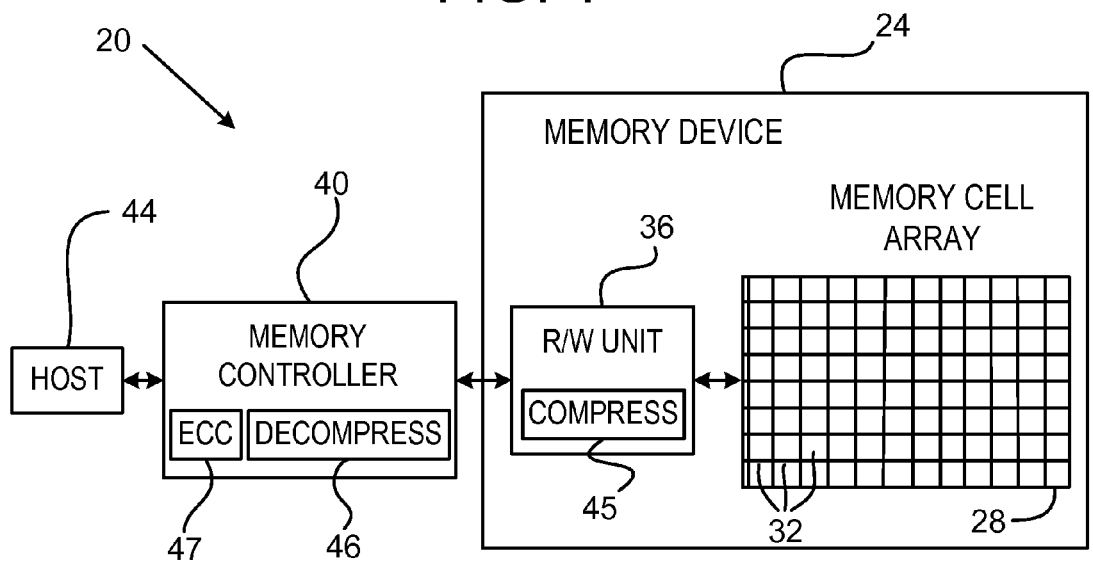
FIG. 1 is a block diagram that schematically illustrates a memory system, in accordance with an embodiment of the present invention.

Data is typically stored in analog memory cells by writing respective storage values to the cells. The storage operation programs each memory cell to one of several programming states, which represent respective data values. Data that is stored in analog memory cells may have varying levels of confidence, i.e., different likelihoods that the data read from the memory cells truly reflects the data that was stored in the cells.

Typically, the storage values (e.g., threshold voltages) of the memory cells that are associated with a given programming state have a certain statistical distribution. When the storage value distributions of different programming states overlap, storage values that lie in boundary regions between adjacent programming states might cause read errors. Such storage values may be regarded as having low confidence levels. Storage values that lie in the middle of the distributions, on the other hand, are more likely to be reliable.

The performance of data readout from analog memory cells can be improved by considering the confidence levels of the different storage values. For example, in some data storage schemes, an Error Correction Code (ECC) unit encodes the data for storage with an ECC and decodes the ECC when retrieving the data. Some ECC decoders decode the ECC by operating on soft metrics. The confidence levels of the read storage values can be used to produce such soft metrics.

However, transferring the confidence levels from the memory cells to the ECC decoder typically adds a considerable amount of communication traffic between the two. A typical read operation retrieves data from thousands of memory cells simultaneously. Transferring the confidence levels assigned to these read results may require an exceedingly high communication rate. The high communication rate can be especially problematic when the memory cells and the ECC decoder reside in separate devices.

Embodiments of the present invention that are described hereinbelow provide improved methods and systems for data readout from analog memory cells. The methods and systems described herein estimate the confidence levels of the storage values, and then compress the confidence levels before they are transferred. The compression of confidence levels is typically efficient, since most of the storage values tend to be reliable, and only a small fraction of the storage values have low confidence levels. In other words, confidence levels often exhibit little or no variability from one storage value to another, and therefore lend themselves to highly efficient compression. Upon arrival at the ECC decoder, the compressed confidence levels are decompressed and used for decoding the ECC.

In one embodiment, the storage values are read using a first set of read thresholds, and the confidence levels are estimated by re-reading the memory cells using a second, different set of read thresholds. The read thresholds in the second set are chosen so as to identify storage values that lie in the boundary regions between programming states. Several examples of compression schemes that can be used for compressing the confidence levels on this basis are described below.

In summary, by transferring compressed confidence levels, the disclosed methods and systems provide the performance benefits of soft ECC decoding while incurring only a small increase in communication traffic.

Typically, the decompressed confidence levels are processed to produce soft metrics of the storage values. The ECC decoder decodes the ECC by operating on the soft metrics. In some embodiments, the memory cells are re-read using different read thresholds, and the soft metrics are refined in an iterative manner until ECC decoding is successful.

System Description

FIG. 1 is a block diagram that schematically illustrates a memory system 20, in accordance with an embodiment of the present invention. System 20 can be used in various host systems and devices, such as in computing devices, cellular phones or other communication terminals, removable memory modules ("disk-on-key" devices), Solid State Disks (SSD), digital cameras, music and other media players and/or any other system or device in which data is stored and retrieved.

System 20 comprises a memory device 24, which stores data in a memory cell array 28. The memory cell array comprises multiple analog memory cells 32. In the context of the present patent application and in the claims, the term "analog memory cell" is used to describe any memory cell that holds a continuous, analog level of a physical quantity, such as an electrical voltage or charge. Array 28 may comprise analog memory cells of any kind, such as, for example, NAND, NOR and CTF Flash cells, PCM, NROM, FRAM, MRAM and DRAM cells. Memory cells 32 may comprise Single-Level Cells (SLC) or Multi-Level Cells (MLC, also referred to as multi-bit cells).

The charge levels stored in the cells and/or the analog voltages or currents written into and read out of the cells are referred to herein collectively as analog values or storage values. Although the embodiments described herein mainly address threshold voltages, the methods and systems described herein may be used with any other suitable kind of storage values.

System 20 stores data in the analog memory cells by programming the cells to assume respective memory states, which are also referred to as programming levels. The programming states are selected from a finite set of possible states, and each state corresponds to a certain nominal storage value. For example, a 2 bit/cell MLC can be programmed to assume one of four possible programming states by writing one of four possible nominal storage values to the cell.

Memory device 24 comprises a reading/writing (R/W) unit 36, which converts data for storage in the memory device to storage values and writes them into memory cells 32. In alternative embodiments, the R/W unit does not perform the conversion, but is provided with voltage samples, i.e., with the storage values for storage in the cells. When reading data out of array 28, R/W unit 36 converts the storage values of memory cells 32 into digital samples having a resolution of one or more bits. The R/W unit typically reads data from cells 32 by comparing the storage values of the cells to one or more read thresholds. Data is typically written to and read from the memory cells in groups that are referred to as pages. In some embodiments, the R/W unit can erase a group of cells 32 by applying one or more negative erasure pulses to the cells.

The storage and retrieval of data in and out of memory device 24 is performed by a memory controller 40, which communicates with device 24 over a suitable interface. In some embodiments, controller 40 produces the storage values for storing in the memory cells and provides these values to R/W unit 36. Alternatively, controller 40 may provide the data for storage, and the conversion to storage values is carried out by the R/W unit internally to the memory device.

Memory controller 40 communicates with a host 44, for accepting data for storage in the memory device and for outputting data retrieved from the memory device. In some embodiments, some or even all of the functions of controller 40 may be implemented in hardware. Alternatively, controller 40 may comprise a microprocessor that runs suitable software, or a combination of hardware and software elements.

In some embodiments, R/W unit 36 comprises a compression module 45, which compresses some of the information that is to be sent to memory controller 40. The memory controller comprises a decompression module 46, which decompresses the compressed information received from memory device 24. In particular, R/W unit 36 may produce confidence levels of the storage values read from cells 32, and module 45 may compress these confidence levels and send them to controller 40. (In some embodiments, module 45 can also be used for compressing other types of information, such as stored data that is retrieved from cells 32.)

The memory controller uses the storage values read from cells 32, and the associated confidence levels, to reconstruct the stored data. For example, memory controller 40 may comprise an Error Correction Code (ECC) unit 47, which encodes the data for storage using a suitable ECC, and decodes the ECC of the data retrieved from memory cells 32. Unit 47 may apply any suitable type of ECC, such as, for example, a Low-Density Parity Check (LDPC) code or a Bose-Chaudhuri-Hocquenghem (BCH) code. In some embodiments, ECC unit 47 uses the confidence levels to improve the ECC decoding performance. Several example methods for obtaining and compressing confidence levels, as well as for using the confidence levels in ECC decoding, are described hereinbelow.

The configuration of FIG. 1 is an exemplary system configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity.

In the exemplary system configuration shown in FIG. 1, memory device 24 and memory controller 40 are implemented as two separate Integrated Circuits (ICs). In alternative embodiments, however, the memory device and the memory controller may be integrated on separate semiconductor dies in a single Multi-Chip Package (MCP) or System on Chip (SoC), and may be interconnected by an internal bus. Further alternatively, some or all of the circuitry of the memory controller may reside on the same die on which the memory array is disposed. Further alternatively, some or all of the functionality of controller 40 can be implemented in software and carried out by a processor or other element of the host system. In some embodiments, host 44 and memory controller 40 may be fabricated on the same die, or on separate dies in the same device package.

In some implementations, a single memory controller may be connected to multiple memory devices 24. In yet another embodiment, some or all of the memory controller functionality may be carried out by a separate unit, referred to as a memory extension, which acts as a slave of memory device 24. Typically, controller 40 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

Memory cells 32 of array 28 are typically arranged in a grid having multiple rows and columns, commonly referred to as word lines and bit lines, respectively. The array is typically divided into multiple pages, i.e., groups of memory cells that are programmed and read simultaneously. Cells are typically erased in groups of word lines that are referred to as erasure blocks. In some embodiments, a given memory devices comprises multiple memory cell arrays, which may be fabricated on separate dies.

Compression of Confidence Level Information

The storage values stored in memory cells 32 often have varying confidence levels. In other words, when attempting to retrieve data from cells 32 by reading their storage values, different storage values may have different likelihoods of truly representing the data that was originally stored. The memory cells that are programmed to a given programming state typically have storage values that are distributed in accordance with a certain statistical distribution. The properties of the storage value distributions depend on various factors and impairments, such as inaccuracies in the programming process, interference from neighboring cells, aging effects and many others.

Within a given storage value distribution, some cells may have higher confidence levels (i.e., high likelihood of being read correctly) while other cells may have lower confidence levels (i.e., higher likelihood of causing read errors). For example, R/W unit 36 typically reads the cells by comparing their storage values to one or more read thresholds, which are positioned between adjacent programming states. Thus, a storage value located in a boundary region between adjacent programming states has a relatively high likelihood of falling on the wrong side of a read threshold and causing a read error. A storage value located in the middle of the distribution can usually be regarded as reliable.

In some embodiments, memory controller 40 uses estimates of these confidence levels to improve the performance of the data readout process. For example, in some embodiments ECC unit 47 decodes the ECC by operating on soft metrics, such as Log Likelihood Ratios (LLRs) of the read storage values or of individual bits represented by these storage values. As another example, some of the storage values that are regarded as unreliable or uncertain may be marked as erasures to the ECC unit. Estimated confidence levels of the read storage values can be used to mark certain storage values as erasures, and/or to produce soft metrics. Soft metrics, erasures and/or any other suitable metrics that assist the ECC unit in decoding the ECC are referred to herein as ECC metrics. Additionally or alternatively, the confidence levels can be used in any suitable way to reconstruct the stored data.

The confidence levels of the storage values can be estimated in various ways. In some embodiments, R/W unit 36 retrieves data from a group of memory cells 32 by comparing their storage values to one or more read thresholds. The R/W unit estimates the confidence levels of these storage values by re-reading the memory cells with a different set of read thresholds, which are positioned so as to identify storage values that are located in boundary regions between adjacent programming states. This technique is demonstrated in FIG. 2 below.

Figure 2:
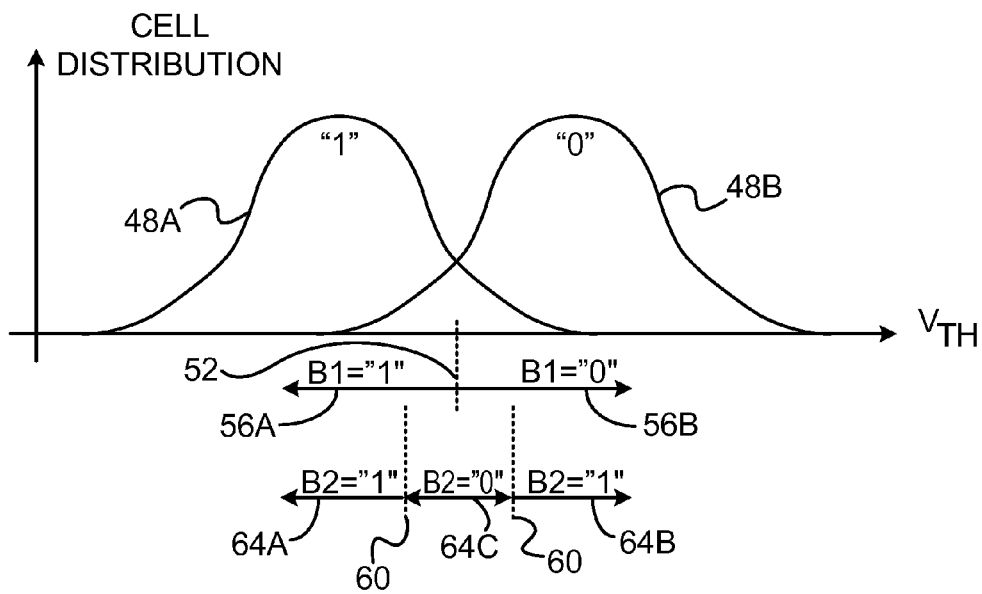
FIG. 2 is a graph showing storage value distributions in a group of analog memory cells, in accordance with an embodiment of the present invention.

FIG. 2 is a graph showing storage value distributions in a group of analog memory cells 32, in accordance with an embodiment of the present invention. In the present example, each memory cell 32 is programmed to one of two programming states, which represent stored data values of "1" and "0". Plots 48A and 48B show the distributions of the storage values (threshold voltages) associated with the "1" and "0" programming states, respectively.

In order to retrieve the data stored in the group of memory cells, R/W unit 36 reads the storage values of the cells by comparing them to a read threshold 52. The comparison results are denoted B1. Read threshold 52 is positioned between the two distributions, and divides the storage value axis into two regions 56A and 56B. Storage values falling below the threshold in region 56A are read as B1="1", and storage values falling above the threshold in region 56B are read as B1="0".

In practice, however, some of the storage values may fall on the wrong side of read threshold 52 and cause read errors. In the example of FIG. 2, distributions 48A and 48B overlap, meaning that some of the storage values associated with state "0" fall in region 56B above threshold 52, and some storage values associated with state "1" fall in region 56A below threshold 52.

In the present example, R/W unit 36 estimates the confidence levels of the storage values by re-reading the memory cells using two additional read thresholds 60. These two read thresholds are positioned slightly above and below threshold 52, and divide the storage value axis into three regions 64A, 64B and 64C. The results of the re-reading operation are denoted B2. Storage values falling in regions 64A and 64B, i.e., below the low threshold or above the high threshold, are assigned B2="1". Storage values falling in region 64C, i.e., between read thresholds 60, are assigned B2="0".

As can be seen in the figure, storage values in regions 64A and 64B are relatively far from the boundary region between distributions 48A and 48B, and are therefore likely to be read correctly by read threshold 52. Storage values falling in region 64B, on the other hand, have a relatively high likelihood of causing read errors when read using read threshold 52.

If a given storage value is assigned B2="1", then the B1 data value read using threshold 52 (which may be B1="0" or B1="1") has a high confidence level. A storage value that is assigned B2="0" has a low confidence level, indicating that the B1 data value read using threshold 52 has a relatively high likelihood of being erroneous. In other words, B2 forms an estimate of the confidence level of the storage values read using threshold 52.

As noted above, ECC unit 47 in memory controller 40 decodes the ECC based on the estimated confidence levels of the read storage values. In order to provide this information to ECC unit 47, R/W unit 36 transfers the estimated confidence levels from memory device 24 to memory controller 40 over the interface that connects the two devices. As can be appreciated, the additional communication volume created by transferring the estimated confidence levels is high and may be unfeasible.

In order to reduce the communication volume between the memory device and the memory controller (or otherwise between the memory cells and the ECC decoder), R/W unit 36 compresses the estimated confidence levels before transferring them to the memory controller. The term "compression" in this context typically means any process that reduces the communication rate or bandwidth that is used for transferring the estimated confidence levels. Compression may be lossless (i.e., required to maintain the original confidence level values without error) or lossy (i.e., allowed a certain error probability due to the compression and decompression process).

In most practical cases, the estimated confidence levels lend themselves to efficient compression, since they exhibit little or no variation from one cell to another. Most compression schemes achieve high compression ratios when operating on data having little variability. In FIG. 2, for example, it can be seen that the vast majority of the storage values have an estimated confidence level of B2="1". Only a small fraction of the storage values fall in region 64B and are assigned B2="0". Thus, a set or sequence of B2 values can typically be compressed with high efficiency. Such a situation is typical of confidence levels, since data storage systems are usually designed to perform at low error probabilities.

R/W unit 36 may compress the estimated confidence levels using any suitable compression scheme. For example, instead of transferring a sequence of estimated confidence levels, the R/W unit may transfer the run lengths of the sequence, i.e., the numbers of successive "0" and "1" runs in the sequence. This compression scheme is commonly known as run-length coding.

The description above refers to 1-bit confidence levels, i.e., to configurations in which each storage value or read data value (B1 value) has a single estimated confidence level (B2 value). In alternative embodiments, however, this scheme can be generalized to multi-bit confidence levels. For example, two or more intervals of different sizes can be defined around read threshold 52, and each storage value can be assigned a confidence level having two or more bits, depending on the interval in which it falls. In other words, each storage value can be assigned a multi-bit confidence level, which is indicative of the distance of the storage value from read threshold 52. Storage values that are further away from the read threshold are assigned high confidence levels, and vice versa.

In some embodiments, the interface between the memory device and the memory controller comprises a parallel bus interface, e.g., an eight-bit bus. In each bus cycle, an 8-bit word comprising eight read data values is transferred over the bus from device 24 to controller 40. In the present example, the R/W unit transfers eight B1 values in each bus cycle.

In one embodiment, an additional line denoted SoftIndication is added to the bus interface. In each bus cycle, the SoftIndication line is set to the logical AND of all the estimated confidence levels (B2 values) of the data values transferred in this cycle. In most cycles, the data (B1) values have high confidence levels (B2="1"), and therefore the SoftIndication line will be "1". In the relatively rare occasion that one or more of the B1 values in the cycle have a low confidence level (B2="0"), the SoftIndication line in that cycle is set to "0". When the SoftIndication line is "0" in a given cycle, the next bus cycle is used for sending an indication as to which of the B1 values sent in the previous cycle had the low confidence level. The following table demonstrates this process:

| Bus cycle # | SoftIndication | Information on bus |
|---|---|---|
| ... | ... | ... |
| ... | ... | ... |
| M | "1" | VAL (N) |
| M + 1 | "1" | VAL (N + 1) |
| M + 2 | "0" | VAL (N + 2) |
| M + 3 | "0" | IND (VAL (N + 2)) |
| M + 4 | "1" | VAL (N + 3) |
| ... | ... | ... |
| ... | ... | ... |
| ... | ... | ... |

During bus cycles M . . . M+2, the bus transfers words containing read data values (B1 values) denoted VAL(N) . . . VAL(N+2), respectively. In words VAL(N) and VAL(N+1), all data values have high confidence levels (B2="1"), and therefore the SoftIndication line during cycles M and M+1 is "1". In word VAL(N+2), on the other hand, one or more of the data values has a low confidence level. Therefore, the SoftIndication line is "0" in cycle M+2. In the following cycle (cycle M+3) the R/W unit sends a word denoted IND(VAL(N+2)), which indicates which of the data values sent in cycle M+2 has a low confidence level. The SoftIndication line is kept at "0" during cycle M+3, as well. In cycle M+4 all the data values have high confidence levels again, and the SoftIndication line returns to "1".

Using this technique, bus cycles are initially used only for transferring the data values. Bus cycles are not added and confidence level information is not transferred as long as the transferred data values have high confidence levels. A bus cycle is added only when one or more data values transferred in a given bus cycle have low confidence level. In a typical implementation, only a small fraction of the transferred words (typically less than 10%) contain data values having low confidence levels. Therefore, the transferring of confidence level information incurs only a small increase in communication volume. Nevertheless, this compression scheme is lossless, i.e., the memory controller is provided with the correct confidence level indication for each transferred data value.

Alternatively, the memory device may transfer the data values (B1 values) over the eight-bit bus, and transfer the compressed confidence levels (compressed B2 values) over the additional SoftIndication line. This scheme assumes that, on average, the rate of the compressed B2 values is at least eight times lower than the rate of the B1 values. In other words, this scheme assumes an average compression ratio of eight or more.

Alternatively to adding a dedicated SoftIndication line, the memory device and memory controller can use one of the existing lines in the interface for this purpose. For example, a Ready/Busy (R/B) line, which often already exists in bus interfaces, can be used. This scheme is beneficial since it avoids adding an additional line to the interface.

In another alternative embodiment, compression module 46 compresses the confidence levels (B2 values) for a set of storage values using any suitable compression scheme. The R/W unit transfers the data values (B1 values) followed by the compressed confidence levels (compressed B2 values). The following table demonstrates this scheme in data readout from a memory page having 8:N data values (e.g., 8·4224=33792 data values per page):

| Bus cycle # | Information on bus |
|---|---|
| 1 | VAL (1) |
| 2 | VAL (2) |
| ... | ... |
| N = 4224 | VAL (N) |
| N + 1 | COMP (1) |
| N + 2 | COMP (2) |
| ... | ... |
| N + M | COMP (M) |

In the present example, the confidence levels of the 8:N data values (N bytes) are compressed to produce 8:M bits (M bytes), M<N. The M bytes are transferred using M bus cycles. In this example, the compression may be either lossless or lossy. In many practical cases, ECC unit 47 is able to decode the ECC successfully even when it operates on confidence levels that were compressed using lossy compression.

In some embodiments, the memory controller may initially read only K out of the M bytes that carry the compressed confidence levels (K<M). In these embodiments, ECC unit 47 initially attempts to decode the ECC using the compressed confidence levels carried in the K bytes. The memory controller reads the additional M-K bytes only if the initial ECC decoding attempt fails. This scheme may reduce the average ECC decoding time, since in many cases the ECC can be decoded successfully using only a subset of the confidence levels.

Figure 3:
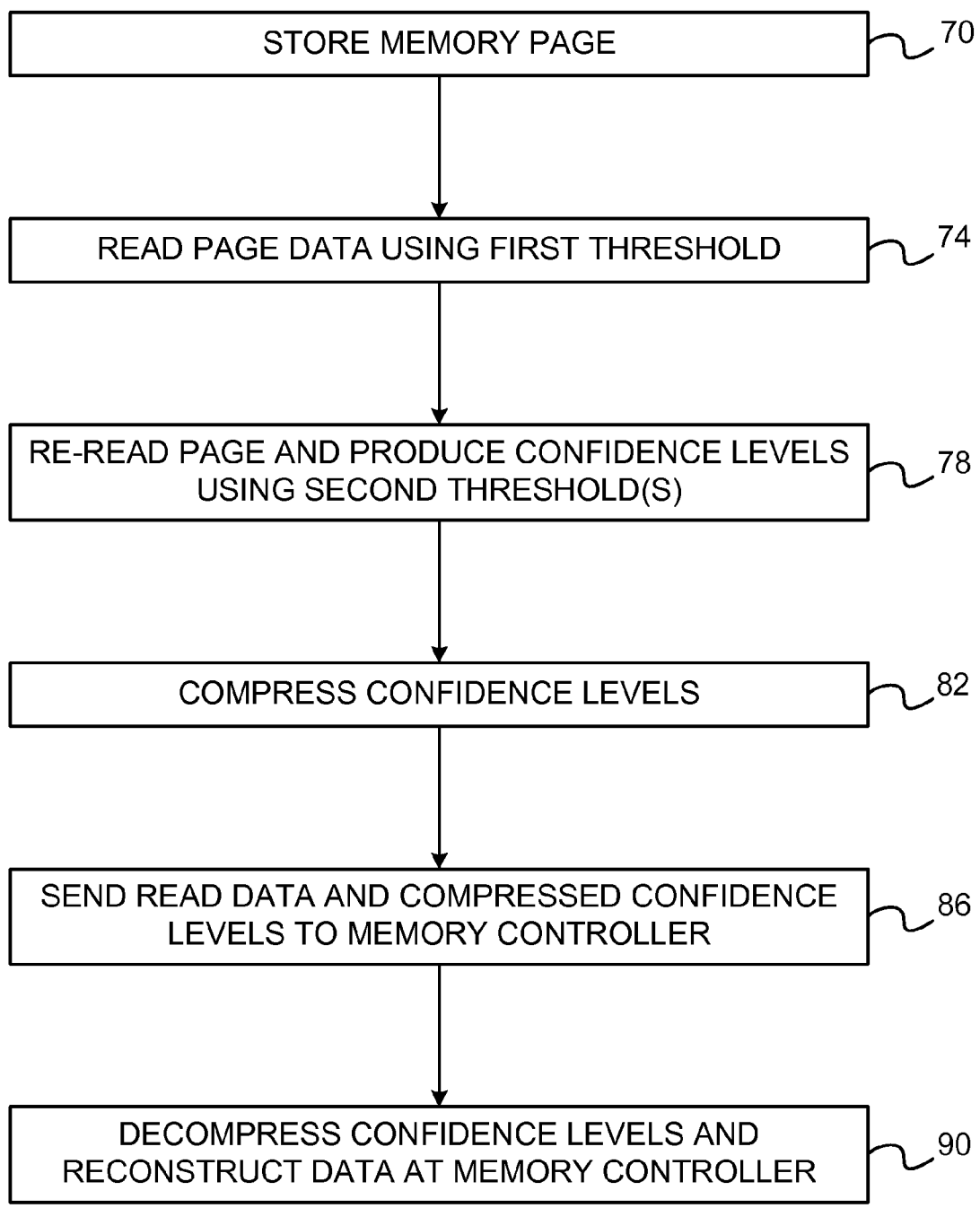
FIGS. 3 and 4 are flow charts that schematically illustrate methods for data readout from analog memory cells, in accordance with embodiments of the present invention.

FIG. 3 is a flow chart that schematically illustrates a method for data readout from analog memory cells 32, in accordance with an embodiment of the present invention. The method begins with memory controller 40 storing a page of data in memory device 24, at a storage step 70. ECC unit 47 in controller 40 encodes the data with an ECC, and the encoded data is transferred to the memory device. In device 24, R/W unit 36 writes storage values representing the encoded data into a group of memory cells 32.

At a later point in time, the memory controller requests the memory device to retrieve the data page in question. In response to the request, R/W unit 36 reads the page, at a reading step 74. The R/W unit reads the page by comparing the storage values of the memory cells in the group to read threshold 52 (see FIG. 2). The comparison results produce the B1 data values shown in FIG. 2. The R/W unit re-reads the page to produce respective estimated confidence levels of the storage values, at a re-reading step 78. The R/W unit re-reads the page using read thresholds 60, to produce the B2 value shown in FIG. 2.

Compression module 45 in R/W unit 36 compresses the estimated confidence levels, at a compression step 82. Any suitable compression scheme, such as the example compression schemes described above, can be used. The R/W unit transfers the read data values and the compressed confidence levels to the memory controller, at a transfer step 86. In memory controller 40, decompression module 46 decompresses the compressed confidence levels received over the interface from the memory device, and reconstructs the data page, at a reconstruction step 90. In particular, ECC unit 47 decodes the ECC of the page using the decompressed confidence levels.

Iterative Refinement of Soft ECC Metrics

As noted above, memory controller 40 may decode the ECC by operating on soft metrics (e.g., LLRs), which are computed based on the confidence levels transferred from the memory device. In some embodiments, the memory controller refines the soft metrics in an iterative manner by obtaining additional confidence level information regarding the storage values of the memory cells. In some embodiments, the memory controller initially attempts to decode the ECC based on the read data values (i.e., using hard metrics), and refines the metrics iteratively until the ECC is decoded successfully.

Figure 4:
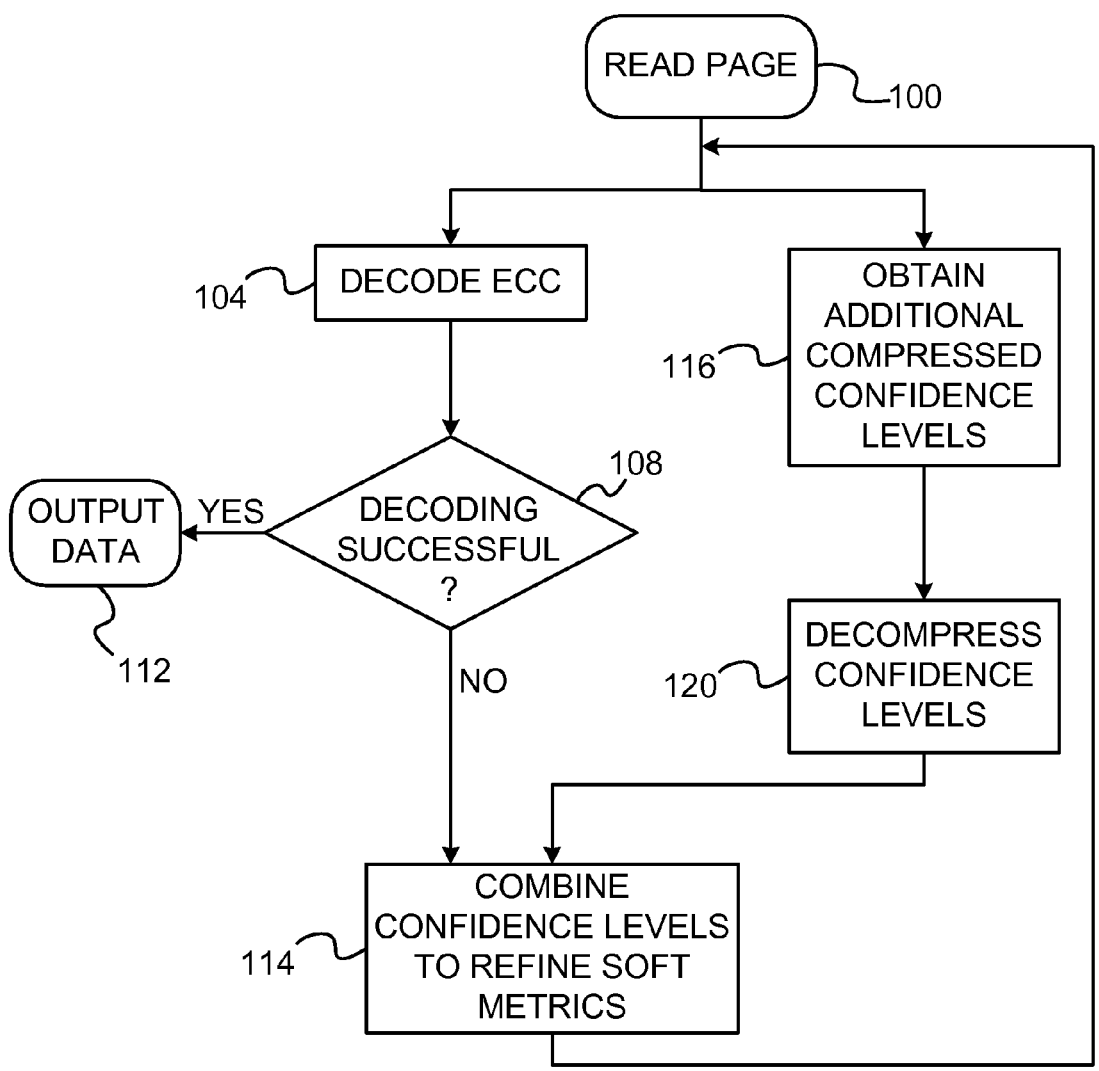

FIG. 4 is a flow chart that schematically illustrates an iterative process for data readout from memory cells 32, in accordance with an embodiment of the present invention. The method begins with memory controller 40 reading the data values of a certain memory page, at a page readout step 100. ECC unit 47 attempts to decode the ECC, at a decoding step 104. The ECC unit decodes the ECC using soft metrics, which are further refined in each iteration. In the first iteration, the metrics comprise the read data values, i.e., hard metrics.

Controller 40 checks whether the ECC is decoded successfully, at a checking step 108. If successful, the memory controller outputs the retrieved data page, and the method terminates, at a termination step 112. If, on the other hand, the ECC decoding attempt failed, the memory controller refines the soft metrics based on additional confidence level information regarding the read storage values, at a refinement step 114.

The additional confidence level information is obtained from memory device 24 concurrently with the ECC decoding attempt. The refined information may comprise, for example, an additional confidence level bit for each storage value. In each iteration, the additional confidence level information is typically obtained by re-reading the page using one or more read thresholds, which are different from the thresholds used in previous iterations.

Examples of schemes for obtaining multi-bit confidence levels are described above. Additional aspects of reading analog memory cells using multiple read thresholds, and of iteratively refining confidence level information and soft metrics, are addressed in PCT International Publications WO 2007/132457, WO 2008/053472, WO 2008/111058 and WO 2008/139441, whose disclosures are incorporated herein by reference. R/W unit 36 in memory device 24 obtains and compresses the additional confidence level information, at a re-reading and compression step 116.

Memory controller 40 decompresses the additional confidence level information, at an additional decompression step 120. The memory controller then combines the confidence level information obtained in the current iteration with the previously-existing confidence level information, at a combining step 114. The new and existing confidence level information is combined so as to refine the soft metrics of the storage values. The method then loops back to step 100 above, in which ECC module 47 attempts to decode the ECC using the refined soft metrics.

When compressing the confidence level information in a given iteration of the method of FIG. 4, the R/W unit may obtain and provide refined confidence level information only for storage values that were identified in previous iterations as having low confidence levels. This technique further reduces the volume of confidence level information transferred to the memory controller. Techniques of this sort are addressed, for example, in U.S. Provisional Patent Applications 61/052,276 and 61/053,031, cited above.

In some embodiments, the memory controller may apply different policies regarding refinement the confidence levels at different stages of the memory device's life cycle. At the beginning of the memory device's life cycle, the distortion in memory cells 32 is relatively low, and ECC decoding using hard metrics is likely to succeed. Toward end-of-life, on the other hand, the distortion level in cells 32 grows, so that hard decoding may be unlikely to succeed. Thus, in some embodiments, the memory device initially begins to operate using the method of FIG. 4 above. At a certain point in time, the memory device may switch to a different mode of operation, in which it requests the memory device to produce soft metrics to begin with, without initially attempting hard decoding.

In some of the above-mentioned methods, a certain memory cell is read using multiple different read thresholds. It is typically desirable to reduce the sense time involved in these multiple reading operation. A possible technique for rapidly reading a given memory cell multiple times using multiple read thresholds is described in PCT International Publication WO 2008/053473, whose disclosure is incorporated herein by reference.

In the description above, the confidence levels are obtained by re-reading the memory cells using different read thresholds. In alternative embodiments, however, the memory device may determine the confidence levels of the storage values using any other suitable method. All of the techniques described below can be carried out as part of the method of FIG. 3 above, or as part of the iterative method of FIG. 4 above. When carrying out the method of FIG. 4, calculation of the refined confidence level information can be performed either after or in semi-parallel with transferring the initial read results and decoding the ECC.

For example, the memory device may initially read the memory cells using a relatively fast read operation, which has a certain accuracy level (e.g., a read operation having a short sense time). The memory device can re-read the memory cells using a slower but more accurate read operation (e.g., by using a longer sense time). The results of the first and second read operations will typically differ in only a small number of cells. Therefore, the differences between the respective read results of the two read operations can be regarded as confidence levels and sent to the controller using any of the methods described herein. In some embodiments, the second read operation is invoked only when the memory controller fails to decode the ECC based on the results of the first read operation. This technique may be particularly suitable for memory devices in which the busy period of the read operation is long.

As another example, the memory device may re-read the memory cells several times (e.g., three times) using the same read thresholds and determine the confidence levels from the multiple read results, e.g., by performing a majority vote. This scheme can be applied iteratively. For example, the memory device can read the memory cells once and transfer the results to the memory controller. Then, the memory device can re-read the memory cells twice more, perform a majority vote and regard any corrections (i.e., discrepancies between the initial read results and the results of the majority vote) as low confidence levels that are to be transferred to the memory controller. As noted above, the additional read operations may be invoked conditionally—upon failure to decode the ECC based on the initial read results.

Although the embodiments described herein mainly address Single-Level Cells (SLC), in which each memory cell stores a single data bit by using two programming states, the principles of the present invention can also be used in Multi-Level Cells (MLC), in which each memory cells stores two or more bits using multiple programming states.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for data storage, comprising:
    storing data in a group of analog memory cells by writing respective input storage values to the memory cells in the group;
    after storing the data, reading respective output storage values from the analog memory cells in the group;
    estimating respective confidence levels of the output storage values;
    compressing the confidence levels; and
    transferring the output storage values and the compressed confidence levels from the memory cells over an interface to a memory controller.

2. The method according to claim 1, and comprising decompressing the transferred output storage values at the memory controller, and reconstructing the data responsively to the output storage values and the decompressed confidence levels.

3. The method according to claim 2, wherein storing the data comprises encoding the data with an Error Correction Code (ECC), and wherein reconstructing the data comprises decoding the ECC responsively to the decompressed confidence levels.

4. The method according to claim 3, wherein decoding the ECC comprises computing respective ECC metrics of the output storage values responsively to the confidence levels, and decoding the ECC responsively to the ECC metrics.

5. The method according to claim 4, and comprising refining at least some of the confidence levels, updating the ECC metrics based on the refined confidence levels and re-decoding the ECC responsively to the updated ECC metrics.

6. The method according to claim 5, wherein refining the confidence levels and updating the ECC metrics comprise:
    at a first time, refining the confidence levels and updating the ECC metrics only responsively to a failure in decoding the ECC; and
    at a second time subsequent to the first time, refining the confidence levels and updating the ECC metrics before initially attempting to decode the ECC.

7. The method according to claim 5, wherein refining the confidence levels comprises refining the confidence levels of only a subset of the output storage values that were previously identified as having a low confidence level.

8. The method according to claim 4, wherein computing the ECC metrics comprises marking some of the output storage values as erasures.

9. The method according to claim 1, wherein reading the output storage values comprises applying one or more first read thresholds to the analog memory cells in the group, and wherein estimating the confidence levels comprises re-reading the analog memory cells in the group using one or more second read thresholds, different from the first read thresholds.

10. The method according to claim 9, wherein storing the data comprises programming each of the analog memory cells in the group to a respective programming state selected from two or more programming states, and wherein re-reading the analog memory cells comprises identifying the output storage values contained in a boundary region separating two of the programming states.

11. The method according to claim 1, wherein reading the output storage values comprises re-reading the output storage values multiple times to produce respective multiple sets of read results, and wherein estimating the confidence levels comprises determining differences between the respective read results in the multiple sets.

12. The method according to claim 11, wherein re-reading the output storage values comprises producing a first set of the read results using a first read operation having a first accuracy level, and producing a second set of the read results using a second read operation having a second accuracy level, finer than the first accuracy level.

13. The method according to claim 1, wherein estimating the confidence levels comprises assigning some of the output storage value a low confidence level, and wherein compressing and transferring the confidence levels comprise indicating to the memory controller only the output storage values having the low confidence level.

14. The method according to claim 13, wherein the interface comprises a parallel bus having a signaling line, wherein transferring the output storage values comprises sending one or more of the output storage values during each cycle of the bus, and wherein indicating the storage values having the low confidence level comprises signaling over the signaling line when at least one of the output storage values sent during a given cycle has the low confidence level.

15. The method according to claim 13, wherein the interface comprises a parallel bus having a signaling line, wherein indicating the storage values having the low confidence level comprises sending the storage values having the low confidence level over the signaling line, and wherein transferring the output storage values comprises sending the output storage values over lines other than the signaling line.

16. Apparatus for data storage, comprising:
a plurality of analog memory cells; and
circuitry, which is coupled to store data in a group of the analog memory cells by writing respective input storage values to the memory cells in the group, to read respective output storage values from the analog memory cells in the group after storing the data, to estimate respective confidence levels of the output storage values, to compress the confidence levels, and to transfer the output storage values and the compressed confidence levels from the memory cells over an interface to a memory controller.

17. The apparatus according to claim 16, wherein the circuitry is coupled to read the output storage values by applying one or more first read thresholds to the analog memory cells in the group, and to estimate the confidence levels by re-reading the analog memory cells in the group using one or more second read thresholds, different from the first read thresholds.

18. The apparatus according to claim 17, wherein the circuitry is coupled to store the data by programming each of the analog memory cells in the group to a respective programming state selected from two or more programming states, and to estimate the confidence levels by identifying, using the second read thresholds, the output storage values contained in a boundary region separating two of the programming states.

19. The apparatus according to claim 16, wherein the circuitry is coupled to re-read the output storage values multiple times to produce respective multiple sets of read results, and to estimate the confidence levels by determining differences between the respective read results in the multiple sets.

20. The apparatus according to claim 19, wherein the circuitry is coupled to produce a first set of the read results using a first read operation having a first accuracy level, and to produce a second set of the read results using a second read operation having a second accuracy level, finer than the first accuracy level.

21. The apparatus according to claim 16, wherein the circuitry is coupled to assign some of the output storage value a low confidence level, and to indicate to the memory controller only the output storage values having the low confidence level.

22. The apparatus according to claim 21, wherein the interface comprises a parallel bus comprising a signaling line, and wherein the circuitry is coupled to send one or more of the output storage values during each cycle of the bus, and to signal over the signaling line when at least one of the output storage values sent during a given cycle has the low confidence level.

23. The apparatus according to claim 21, wherein the interface comprises a parallel bus comprising a signaling line, and wherein the circuitry is coupled to send the storage values having the low confidence level over the signaling line and to send the output storage values over lines other than the signaling line.

24. Apparatus for data storage, comprising:
a memory device, comprising:
a plurality of analog memory cells; and
circuitry, which is coupled to store data in a group of the analog memory cells by writing respective input storage values to the memory cells in the group, to read respective output storage values from the analog memory cells in the group after storing the data, to estimate respective confidence levels of the output storage values, to compress the confidence levels, and to transfer the output storage values and the compressed confidence levels from the memory cells over an interface; and
a memory controller, which is configured to receive the output storage values and the compressed confidence levels over the interface, to decompress the transferred output storage values and to reconstruct the data responsively to the output storage values and the decompressed confidence levels.

25. The apparatus according to claim 24, wherein the memory controller comprises an Error Correction Code (ECC) unit, which is coupled to encode the stored data with an ECC, and to reconstruct the data by decoding the ECC responsively to the decompressed confidence levels.

26. The apparatus according to claim 25, wherein the memory controller is configured to compute respective ECC metrics of the output storage values responsively to the confidence levels, and wherein the ECC unit is coupled to decode the ECC responsively to the ECC metrics.

27. The apparatus according to claim 26, wherein the memory controller is configured to cause the circuitry to refine at least some of the confidence levels, to update the ECC metrics based on the refined confidence levels and to cause the ECC unit to re-decode the ECC responsively to the updated ECC metrics.

28. The apparatus according to claim 27, wherein the memory controller is configured, at a first time, to cause the circuitry to refine the confidence levels and to update the ECC metrics only responsively to a failure in decoding the ECC, and, at a second time subsequent to the first time, to cause the circuitry to refine the confidence levels and to update the ECC metrics before initially attempting to decode the ECC.

29. The apparatus according to claim 27, wherein the memory controller is configured to cause the circuitry to refine the confidence levels of only a subset of the output storage values that were previously identified as having a low confidence level.

30. The apparatus according to claim 26, wherein the memory controller is configured to mark some of the output storage values as erasures for the ECC unit.

31. The apparatus according to claim 24, wherein the circuitry is coupled to read the output storage values by applying one or more first read thresholds to the analog memory cells in the group, and to estimate the confidence levels by re-reading the analog memory cells in the group using one or more second read thresholds, different from the first read thresholds.

32. The apparatus according to claim 31, wherein the circuitry is coupled to store the data by programming each of the analog memory cells in the group to a respective programming state selected from two or more programming states, and to estimate the confidence levels by identifying, using the second read thresholds, the output storage values contained in a boundary region separating two of the programming states.

33. The apparatus according to claim 24, wherein the circuitry is coupled to assign some of the output storage value a low confidence level, and to indicate to the memory controller only the output storage values having the low confidence level.

34. The apparatus according to claim 33, wherein the interface comprises a parallel bus comprising a dedicated signaling line, and wherein the circuitry is coupled to send one or more of the output storage values during each cycle of the bus, and to signal over the dedicated signaling line when at least one of the output storage values sent during a given cycle has the low confidence level.

* * * * *